(12) United States Patent
Lim et al.

(10) Patent No.: US 11,733,872 B2
(45) Date of Patent: Aug. 22, 2023

(54) STORAGE DEVICE AND SYSTEM OF CONTROLLING OPERATION THROUGH FLOW CONTROL MONITORING

(71) Applicant: SAMSUNG ELECTRONICS CO., LTD., Suwon-si (KR)

(72) Inventors: Jaehwan Lim, Seongnam-si (KR); Walter Jun, Seoul (KR); Jaeeun Kim, Yongin-si (KR); Jihoon Kim, Seoul (KR); Kihyeon Myung, Seoul (KR); Hyunjung Yoo, Seoul (KR); Jungwoo Lee, Hwaseong-si (KR)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 17/706,137

(22) Filed: Mar. 28, 2022

(65) Prior Publication Data
US 2023/0094436 A1 Mar. 30, 2023

(30) Foreign Application Priority Data

Sep. 28, 2021 (KR) ........................ 10-2021-0128005

(51) Int. Cl.
*G06F 3/06* (2006.01)
*G06F 13/42* (2006.01)

(52) U.S. Cl.
CPC .......... *G06F 3/0613* (2013.01); *G06F 3/0656* (2013.01); *G06F 3/0673* (2013.01); *G06F 13/4221* (2013.01); *G06F 2213/0026* (2013.01)

(58) Field of Classification Search
CPC ....... G06F 3/00; G06F 3/0659; G06F 13/4045
See application file for complete search history.

(56) References Cited

U.S. PATENT DOCUMENTS 7,827,325 B2    11/2010  Adar et al.
9,467,120 B1    10/2016  Song
(Continued)

FOREIGN PATENT DOCUMENTS

JP    2006148227 A    6/2006
JP    4376165 B2      9/2009
(Continued)

OTHER PUBLICATIONS

European Search Report dated Nov. 11, 2022 From European Office Cited in European Patent Application No. 22166658.9.

*Primary Examiner* — Getente A Yimer
(74) *Attorney, Agent, or Firm* — Fish & Richardson P.C.

(57) ABSTRACT

A system includes a transmission device and a reception device that are connected through a link. The reception device includes a reception buffer configured to receive and store transaction layer packets and a reception flow controller configured to generate flow control packets by monitoring an occupation state of the reception buffer. The transmission device includes a transmission buffer, a transmission flow controller and a dynamic frequency controller. The transmission buffer stores pending transaction layer packets to be transferred to the reception device. The transmission flow controller controls a flow of transaction layer packets to be transferred to the reception device based on the flow control packets received from the reception device. The dynamic frequency controller controls a frequency of an internal clock signal of the transmission device by monitoring a state of the transmission buffer and a state of the transmission flow controller.

20 Claims, 30 Drawing Sheets

(56) References Cited

U.S. PATENT DOCUMENTS

| | | | |
|---|---|---|---|
| 10,049,074 B2 | 8/2018 | Atherton et al. | |
| 10,198,214 B2 | 2/2019 | Kim et al. | |
| 11,003,616 B1* | 5/2021 | Nakibly | G06F 13/4013 |
| 11,093,166 B2 | 8/2021 | Kim et al. | |
| 11,366,776 B1* | 6/2022 | Zhai | G06F 13/1668 |
| 2005/0259651 A1 | 11/2005 | Yashima | |
| 2015/0277482 A1 | 10/2015 | Kohzeki et al. | |
| 2017/0286359 A1* | 10/2017 | McGowan | G06F 13/4291 |
| 2020/0265000 A1* | 8/2020 | Nagata | G06F 13/4045 |
| 2020/0293465 A1* | 9/2020 | Yang | H04L 49/70 |

FOREIGN PATENT DOCUMENTS

| | | |
|---|---|---|
| JP | 20090205334 A | 9/2009 |
| JP | 5212196 A | 9/2010 |
| KR | 2211126 A | 10/2015 |

\* cited by examiner (PHY OUTPUT MODE)

(PHY INPUT MODE)

FIG. 13

| PCIe SPEED | | Phase1 | Phase2 | Phase3 | Phase4 |
|---|---|---|---|---|---|
| PCIe Gen1 | 2.5GT/s | 250MHz | - | - | - |
| PCIe Gen2 | 5.0GT/s | 250MHz | 500MHz | - | - |
| PCIe Gen3 | 8.0GT/s | 250MHz | 500MHz | 1000MHz | - |
| PCIe Gen4 | 16GT/s | 250MHz | 500MHz | 1000MHz | 2000MHz |
| PCIe Gen5 | 32GT/s | 500MHz | 1000MHz | 2000MHz | 4000MHz |
| PCIe Gen6 | 64GT/s | 1000MHz | 2000MHz | 4000MHz | - |

FIG. 14

| PCLK_Rate[4:0] | |
|---|---|
| 00000 | 62.5MHz |
| 00001 | 125MHz |
| 00010 | 250MHz |
| 00011 | 500MHz |
| 00100 | 1000MHz |
| 00101 | 2000MHz |
| 00111 | 4000MHz |
| 01000~11111 | Reserved |

STORAGE DEVICE AND SYSTEM OF CONTROLLING OPERATION THROUGH FLOW CONTROL MONITORING

CROSS-REFERENCE TO RELATED APPLICATION

This U.S. non-provisional application claims priority under 35 USC § 119 to Korean Patent Application No. 10-2021-0128005, filed on Sep. 28, 2021, in the Korean Intellectual Property Office (KIPO), the disclosure of which is incorporated by reference herein in its entirety.

BACKGROUND

1. Technical Field

Exemplary embodiments relate generally to semiconductor integrated circuits, and more particularly to a storage device and a system of controlling its operation through flow control monitoring.

2. Discussion of the Related Art

One or more semiconductor memory devices may be used in data storage devices. Examples of such data storage devices include solid state drives (SSDs). These types of data storage devices may have various design and/or performance advantages over hard disk drives (HDDs). For example, such data storage devices may have no moving mechanical parts, higher data access speeds, improved stability, improved durability, and/or reduced power consumption. Various systems, e.g., a laptop computer, a car, an airplane, a drone, etc., have adopted the storage devices. If the data storage device does not satisfy required performance, the entire performance of the system may be degraded. If the operational speed of the data storage device is increased beyond the required operational speed, power consumption of the data storage device and the system including the data storage device may be increased unnecessarily.

SUMMARY

Some exemplary embodiments may provide a system capable of efficiently controlling transfer flow between a transmission device and a reception device.

Some exemplary embodiments may provide a storage device capable of efficiently controlling transfer flow between the storage device and a host device.

According to exemplary embodiments, a system includes a transmission device and a reception device that are connected through a link. The reception device includes a reception buffer configured to receive and store transaction layer packets and a reception flow controller configured to generate flow control packets by monitoring an occupation state of the reception buffer. The transmission device includes a transmission buffer, a transmission flow controller and a dynamic frequency controller. The transmission buffer stores pending transaction layer packets to be transferred to the reception device. The transmission flow controller controls a flow of transaction layer packets to be transferred to the reception device based on the flow control packets received from the reception device. The dynamic frequency controller controls a frequency of an internal clock signal of the transmission device by monitoring a state of the transmission buffer and a state of the transmission flow controller.

According to exemplary embodiments, a storage device is connected to a host device through a peripheral component interconnect express (PCIe) link according to PCIe standards. The storage device includes a nonvolatile memory device configured to store data, and a storage controller configured to control the nonvolatile memory device. The storage controller includes a transmission buffer configured to store pending transaction layer packets to be transferred to the host device, a transmission flow controller configured to control a flow of transaction layer packets to be transferred to the host device based on flow control packets received from the host device, and a dynamic frequency controller configured to control a frequency of an internal clock signal of the storage controller by monitoring a state of the transmission buffer and a state of the transmission flow controller.

According to exemplary embodiments, a system includes a first device and a second device that are connected through a peripheral component interconnect express (PCIe) link according to PCIe standards. Each of the first device and the second device includes a reception buffer configured to receive and store transaction layer packets that are transferred through the PCIe link, a reception flow controller configured to generate flow control packets by monitoring an occupation state of the reception buffer, a transmission buffer configured to store pending transaction layer packets to be transferred through the PCIe link, a transmission flow controller configured to control a flow of transaction layer packets transferred through the PCIe link based on the flow control packets received through the PCIe link, and a dynamic frequency controller configured to control a frequency of an internal clock signal of each of the first device and second device by monitoring a state of the transmission buffer and a state of the transmission flow controller.

The system according to exemplary embodiments may reduce power consumption of the transmission device and prevent a transfer delay from the transmission device to the reception device by controlling the frequency of the internal clock signal of the transmission device based on the monitoring result of the state of the transmission buffer and the state of the transmission flow controller.

The storage device according to exemplary embodiments may reduce power consumption of the storage device and prevent a transfer delay from the storage device to the host device by controlling the frequency of the internal clock signal of the storage device based on the monitoring result of the state of the transmission buffer and the state of the transmission flow controller.

BRIEF DESCRIPTION OF THE DRAWINGS

Exemplary embodiments of the present disclosure will be more clearly understood from the following detailed description taken in conjunction with the accompanying drawings.

FIG. 13 is a diagram illustrating a frequency of an internal clock signal specified by PIPE (PHY Interface for PCI Express) standards.

FIG. 14 is a diagram illustrating an exemplary embodiment of setting a plurality of step frequencies of an internal clock signal in a system according to exemplary embodiments.

DETAILED DESCRIPTION OF THE EMBODIMENTS

Figure 1:
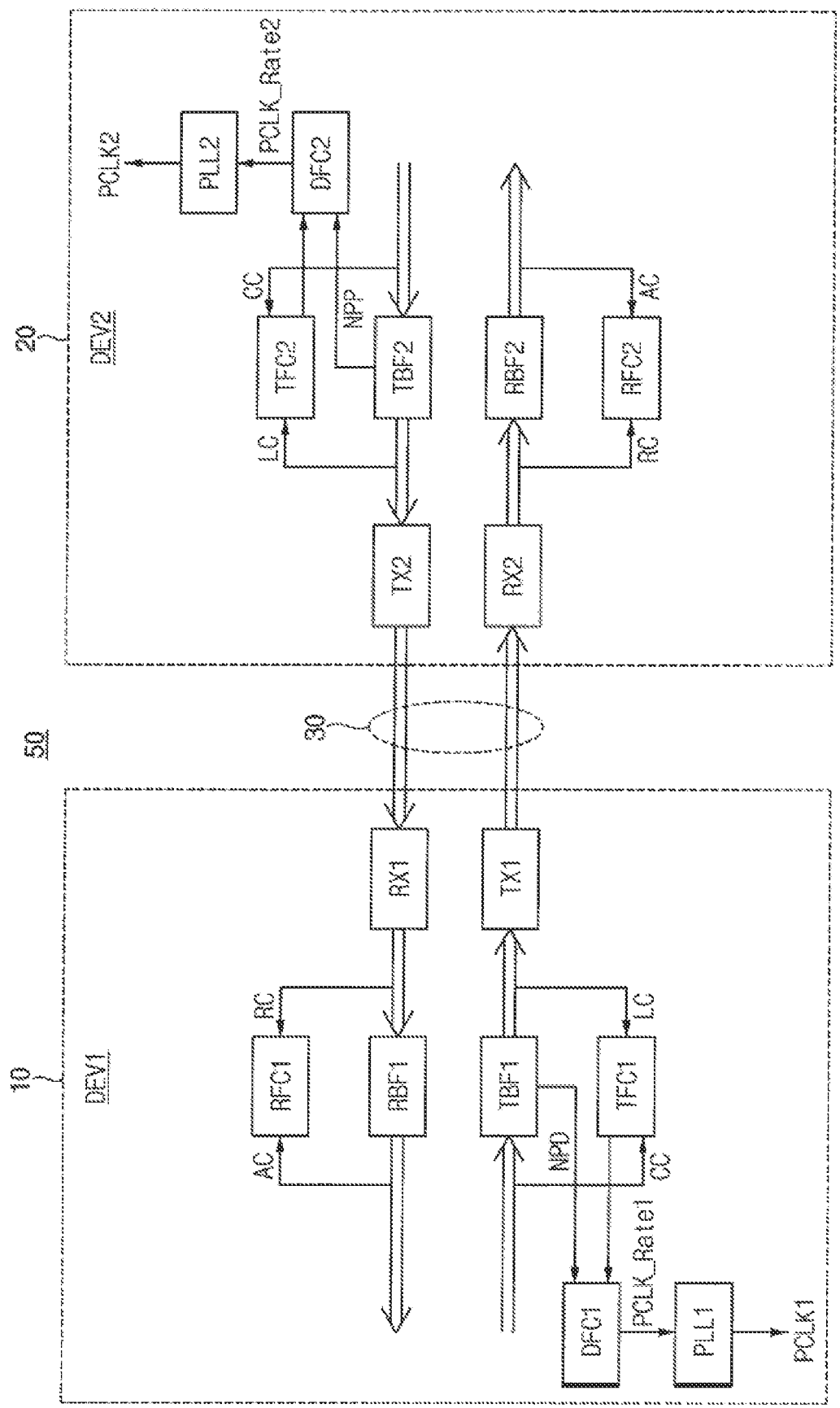
FIG. 1 is a block diagram illustrating a system according to exemplary embodiments.

Various exemplary embodiments will be described more fully hereinafter with reference to the accompanying drawings, in which some exemplary embodiments are shown. In the drawings, like numerals refer to like elements throughout. The repeated descriptions may be omitted as redundant.

In the following descriptions, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of this disclosure. It will be apparent, however, to one skilled in the art that these specific details need not be employed to practice the principles and solutions discussed in this disclosure.

Among various interconnect fabric architectures, exemplary embodiments are described based on a Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, Error Handling and Credit-based Flow Control are among some of the advanced features supported by PCI Express.

In the previous PCI schemes, a transmission device does not know a state of a reception buffer in a reception device. If a transaction is halted due to fullness of the reception buffer, the transmission device continues resending the transaction until the transaction is completed. Thus a particular device may occupy a system bus for a long time and performance of the system may be seriously degraded.

According to the improved PCIe schemes, the transmission device may check the state of the reception port before transmitting a transaction packet. The end point devices such as a host device and a storage device may use a credit-based control mechanism. Each reception port may transfer an entire size of the reception buffer during system initialization, and the reception port periodically transfers the number of credits indicating the remained capacity of the reception buffer to the transmission port to share the occupation state of the reception buffer.

When the allocated size of the reception buffer is not sufficient, the transmission device (e.g., a storage device) may not transfer the transaction packets to the reception device (e.g., a host device), and a transfer delay occurs until the transmission device receives the undated information on the flow control credit. Such transfer delay may degrade performance of the storage device and the entire system.

It is expected that the performance degradation of the end point device such as the storage device may be deepen due to restriction of the buffer size of the host device according to an increase of operation speed of interconnect architectures such as PCIe. Exemplary embodiments are provided to improve the performance degradation by monitoring a flow control credit update logic, that is, a transmission flow controller at the end point device.

FIG. 1 is a block diagram illustrating a system according to exemplary embodiments.

Referring to FIG. 1, a system 50 may include a first device DEV1 10 and a second device DEV2 20 that are connected through a link 30. FIG. 1 illustrates only the elements for describing exemplary embodiments, and each of the first and second devices 10 and 20 may further include various other elements depending on its own functionality.

The first device 10 may include a first receiver RX1, a first reception buffer RBF1, a first reception flow controller RFC1, a first transmitter TX1, a first transmission buffer TBF1, a first transmission flow controller TFC1, a first dynamic frequency controller DFC1 and a first phase-locked loop PLL1. The first receiver RX1, the first reception buffer RBF1 and the first reception flow controller RFC1 correspond to a reception block to receive data and/or signals (hereinafter, referred to as packets) transferred from the second device 20 through the link 30, and the first transmitter TX1, the first transmission buffer TBF1, the first transmission flow controller TFC1 and the first dynamic frequency controller DFC1 correspond to a transmission block to transmit packets to the second device 20 through the link 30.

The second device 20 may include a second receiver RX2, a second reception buffer RBF2, a second reception flow controller RFC2, a second transmitter TX2, a second transmission buffer TBF2, a second transmission flow controller TFC2, a second dynamic frequency controller DFC2 and a second phase-locked loop PLL2. The second receiver RX2, the second reception buffer RBF2 and the second reception flow controller RFC2 correspond to a reception block to receive packets transferred from the first device 10 through the link 30, and the second transmitter TX2, the second transmission buffer TBF2, the second transmission flow controller TFC2 and the second dynamic frequency controller DFC2 correspond to a transmission block to transmit packets to the first device 10 through the link 30.

In some exemplary embodiments, the first device 10 and the second device 20 may be connected through a peripheral component interconnect express (PCIe) link 30 according to PCIe standards, Each of the reception buffers RBF1 and RBF2 may receive and store transaction layer packets that are transferred through the PCIe link 30. Each of the reception flow controllers RFC1 and RFC2 may generate flow control packets by monitoring an occupation state of each of the reception buffers RBF1 and RBF2.

Each of the transmission buffers TBF1 and TBF2 may store pending transaction layer packets to be transferred through the PCIe link 30. Each of the transmission flow controllers TFC1 and TFC2 may control a flow of transaction layer packets transferred through the PCIe link 30 based on the flow control packets received through the PCIe link 30. Each of the dynamic frequency controllers DFC1 and DFC2 may control a frequency of each of internal clock signals PCLK1 and PCLK2 of the first device 10 and second device 20 by monitoring a state of each of the transmission buffers TBF1 and TBF2 and a state of each of the transmission flow controllers TFC1 and TFC2.

FIG. 1 illustrates an exemplary embodiment in which each of the first device 10 and the second device 20 includes the reception block and the transmission block exchanges packets through the bi-directional link 30 and thus functions as a transceiver device.

When the packets are transferred from the second device 20 to the first device 10, the first device 10 corresponds to a reception device and the second device 20 corresponds to a transmission device. In contrast, when the packets are transferred from the first device 10 to the second device 20, the first device 10 corresponds to a transmission device and the second device 20 corresponds to a reception device.

According to exemplary embodiments, the first device 10 and the second device 20 may connected through a uni-directional link. In such a case, one of the first device 10 and the second 20 device may include only the transmission block and the other of the first device 10 and the second 20 device may include only the reception block.

Hereinafter, exemplary embodiments are described which are based on a relationship between one reception device and one transmission device and it will be understood that such exemplary embodiment may be applied to two transceiver devices such as the first device 10 and the second device 20 performing in the bi-directional communication mode as illustrated in FIG. 1.

Figure 2:
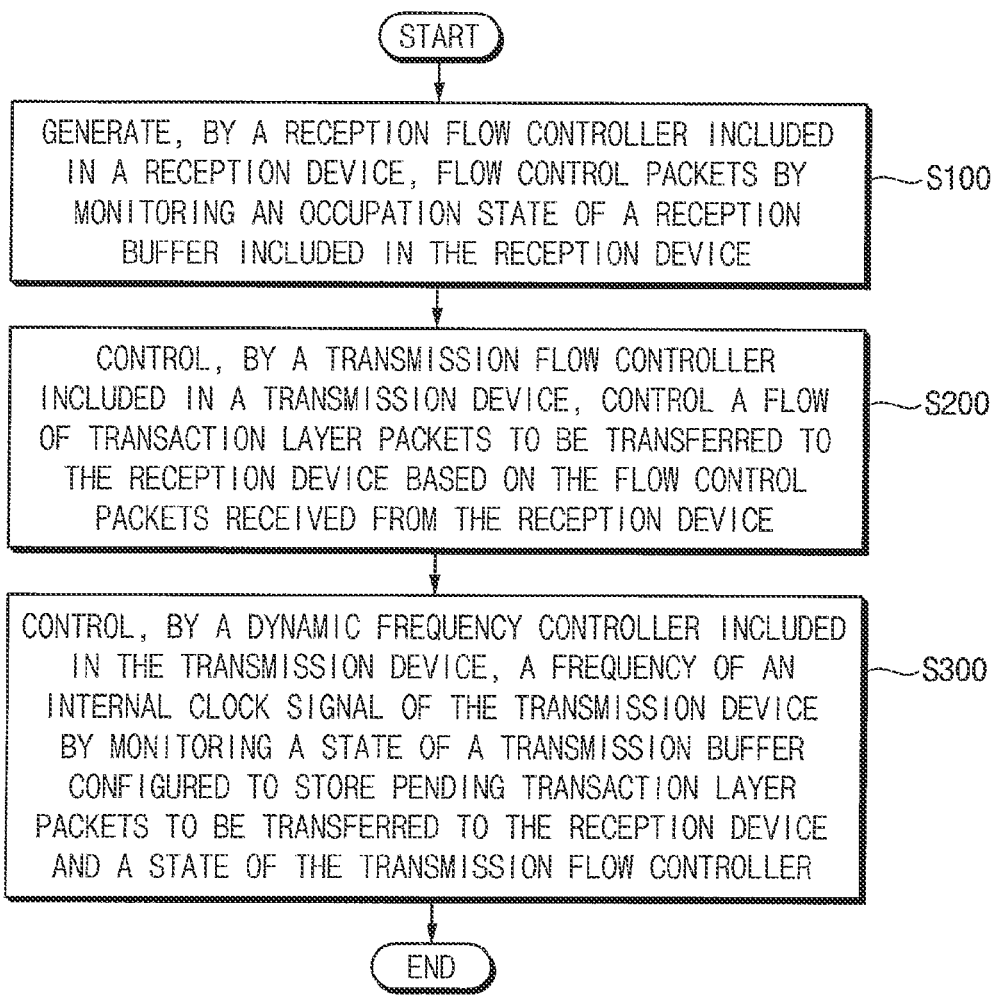
FIG. 2 is a flowchart illustrating a method of controlling operation of a system according to exemplary embodiments.

FIG. 2 is a flowchart illustrating a method of controlling operation of a system according to exemplary embodiments.

Referring to FIGS. 1 and 2, by a reception flow controller (e.g., RFC1 or RFC2 in FIG. 1) included in a reception device (e.g., 10 and 20 in FIG. 1), flow control packets may be generated by monitoring an occupation state of a reception buffer (e.g., RFB 1 or RBF2 in FIG. 1) included in the reception device (S100).

By a transmission flow controller (e.g., TFC2 or TFC1 in FIG. 1) included in a transmission device (e.g., 20 or 10 in FIG. 1), a flow of transaction layer packets to be transferred to the reception device may be controlled based on the flow control packets received from the reception device (S200).

By a dynamic frequency controller (e.g., DFC2 or DFC1 in FIG. 1) included in the transmission device, a frequency of an internal clock signal (e.g., PCLK2 or PCLK1 in FIG. 1) of the transmission device may be controlled by monitoring a state of a transmission buffer (e.g., TBF2 or TBF1 in FIG. 1) configured to store pending transaction layer packets to be transferred to the reception device and a state of the transmission flow controller (S300).

In some exemplary embodiments, the reception flow controller may generate an allocated credit AC corresponding to the number of the transaction layer packets that are output from the reception buffer and processed by an internal circuit and then generate the flow control packets including the allocated credit AC. In addition, the reception flow controller may generate a received credit RC corresponding to the number of the transaction layer packets that are input to and stored in the reception buffer. The reception flow controller may monitor error occurrence by comparing the allocated credit AC and the received credit RC.

The transmission flow controller may generate a limit credit LC that is updated based on the allocated credit AC included on the flow control packets and a consumed credit CC corresponding to the number of the transaction layer packets that are transferred to the reception device. The transmission flow controller may determine whether a storage space of the reception buffer is insufficient to store the transaction layer packets, based on a difference between the limit credit LC and the consumed credit CC. The transmission flow controller may block transmission of the transaction layer packets to the reception device when the transmission flow controller determines that the storage space of the reception buffer is insufficient to store the transaction layer packets.

The dynamic frequency controller in the transmission device may control the frequency of the internal clock signal of the transmission device by monitoring a state of the transmission buffer and a state of the transmission flow controller. The dynamic frequency controller may monitor the limit credit LC and the consumed credit CC that correspond to the state of the transmission flow controller. In addition, the dynamic frequency controller may monitor a number NPP of the pending transaction layer packets stored in the transmission buffer and the number NPP of the pending transaction layer packets corresponding to the state of the transmission buffer.

The dynamic frequency controller (e.g., DFC2 or DFC1 in FIG. 1) may generate a control value (e.g., PCLK_Rate2 or PCLK_Rate1 in FIG. 1) based on the limit credit LC, the consumed credit CC and the number NPP of the pending transaction layer packets. The phase-locked loop (e.g., PLL2 or PLL1 in FIG. 1) may generate the internal clock signal (e.g., PCLK2 or PCLK1 in FIG. 1) having the frequency corresponding to the control value.

As such, the system 50 according to exemplary embodiments may reduce power consumption of the transmission device (e.g., 20 or 10 in FIG. 1) and prevent a transfer delay from the transmission device to the reception device (e.g., 10 or 20 in FIG. 1) by controlling the frequency of the internal clock signal (e.g., PCLK2 or PCLK1 in FIG. 1) of the transmission device based on the monitoring result of the state of the transmission buffer (e.g., TBF2 or TBF1 in FIG. 1) and the state of the transmission flow controller (e.g., TFC2 or TFC1 in FIG. 1).

Figure 3:
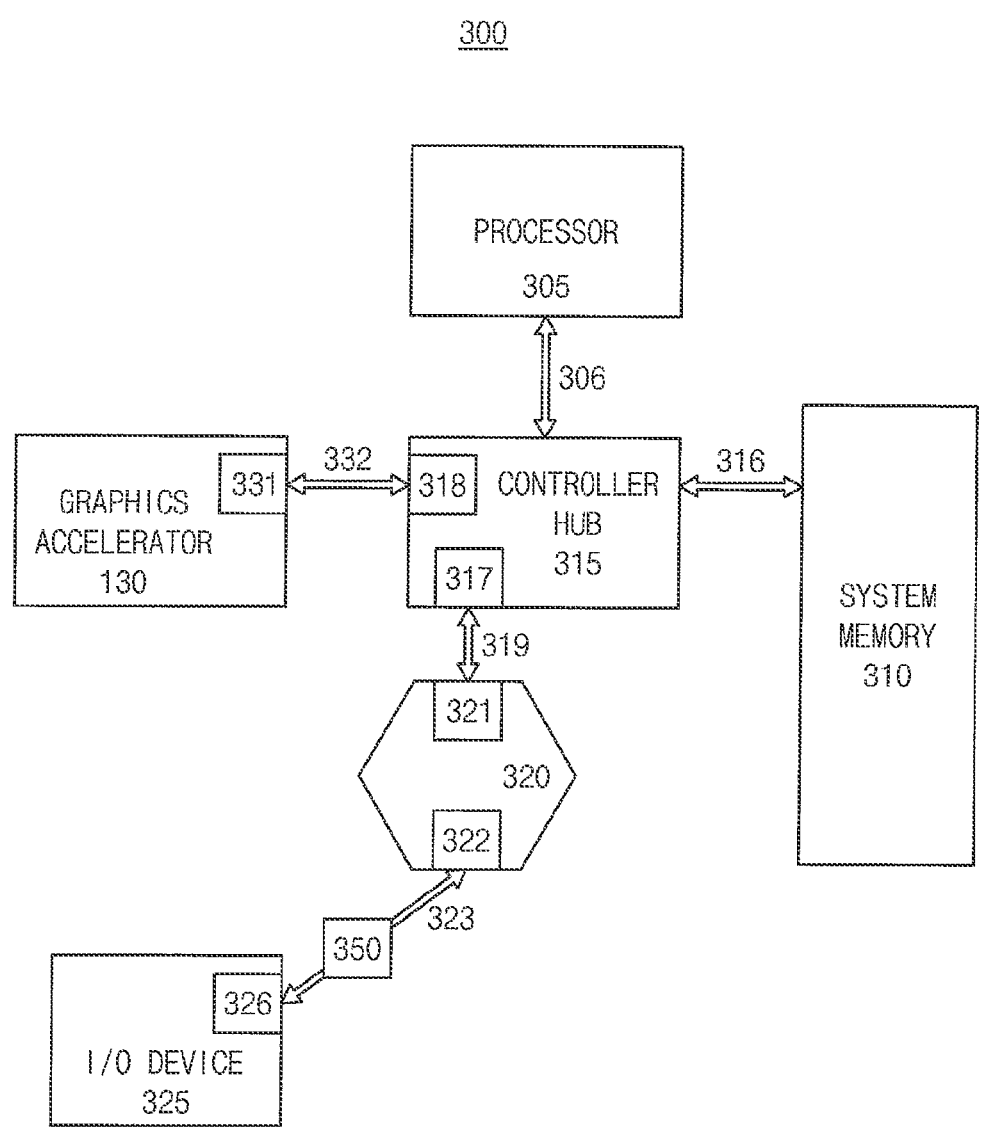
FIG. 3 is a block diagram illustrating a system including an interconnect architecture according to exemplary embodiments.

FIG. 3 is a block diagram illustrating a system including an interconnect architecture according to exemplary embodiments.

Referring to FIG. 3, an exemplary embodiment of a design composed of point-to-point links that interconnect a set of components is illustrated. A system 300 includes processor 305 and a system memory 310 coupled to a controller hub 315. The processor 305 includes any processing element, such as a microprocessor, a host processor, an embedded processor, a co-processor, or other processor. The processor 305 is coupled to the controller hub 315 through a front-side bus (FSB) 306. In one exemplary embodiment, The FSB 306 is a serial point-to-point interconnect as described below. In another exemplary embodiment, the FSB 306 includes a serial, differential interconnect architecture that is compliant with a different interconnect standard.

The system memory 310 includes any memory device, such as random access memory (RAM), non-volatile (NV) memory, solid state memory, or other memory accessible by devices in the system 300. The system memory 310 is coupled to the controller hub 315 through a memory interface 316. Examples of a memory interface include a double-data rate (DDR) memory interface, a dual-channel DDR memory interface, and a dynamic RAM (DRAM) memory interface.

In one exemplary embodiment, the controller hub 315 is a root hub, root complex, or root controller in a Peripheral Component Interconnect Express (PCIe or PCIE) interconnection hierarchy. Examples of the controller hub 315 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with the processor 305, while the controller hub 315 is used to communicate with I/O devices, in a similar manner as described below. In some exemplary embodiments, peer-to-peer routing is optionally supported through the root complex or the controller hub 315.

Here, the controller hub 315 is coupled to a switch/bridge 320 through a serial link 319. Input/output modules 317 and 321, which may also be referred to as interfaces/ports 317 and 321, include/implement a layered protocol stack to provide communication between the controller hub 315 and the switch 320. In one e exemplary embodiment, multiple devices are capable of being coupled to the switch 320.

The switch/bridge 320 routes packets/messages from a device 325 upstream, i.e. up a hierarchy towards a root complex, to the controller hub 315 and downstream, i.e. down a hierarchy away from a root controller, from the processor 305 or the system memory 310 to the device 325. The switch 320, in one e exemplary embodiment, is referred to as a logical assembly of multiple virtual PCI-to-PCI bridge devices. The device 325 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such a device, is referred to as an endpoint. Although not specifically shown, the device 325 may include a PCIe to PCI/PCI-X bridge to support legacy or other version PCI devices. Endpoint devices in PCIe are often classified as legacy, PCIe, or root complex integrated endpoints.

A graphics accelerator 330 is also coupled to the controller hub 315 through a serial link 332. In one exemplary embodiment, the graphics accelerator 330 is coupled to an MCH, which is coupled to an ICH. The switch 320, and accordingly the I/O device 325, is then coupled to the ICH. The I/O modules 331 and 318 are also used to implement a layered protocol stack to communicate between the graphics accelerator 330 and the controller hub 315. Similar to the MCH discussion above, a graphics controller or the graphics accelerator 330 itself, may be integrated in the processor 305. It should be appreciated that one or more of the components (e.g., 105, 110, 115, 120, 125, 130) illustrated in FIG. 3 may be enhanced to execute, store, and/or embody logic to implement one or more of the features described herein.

Figure 4:
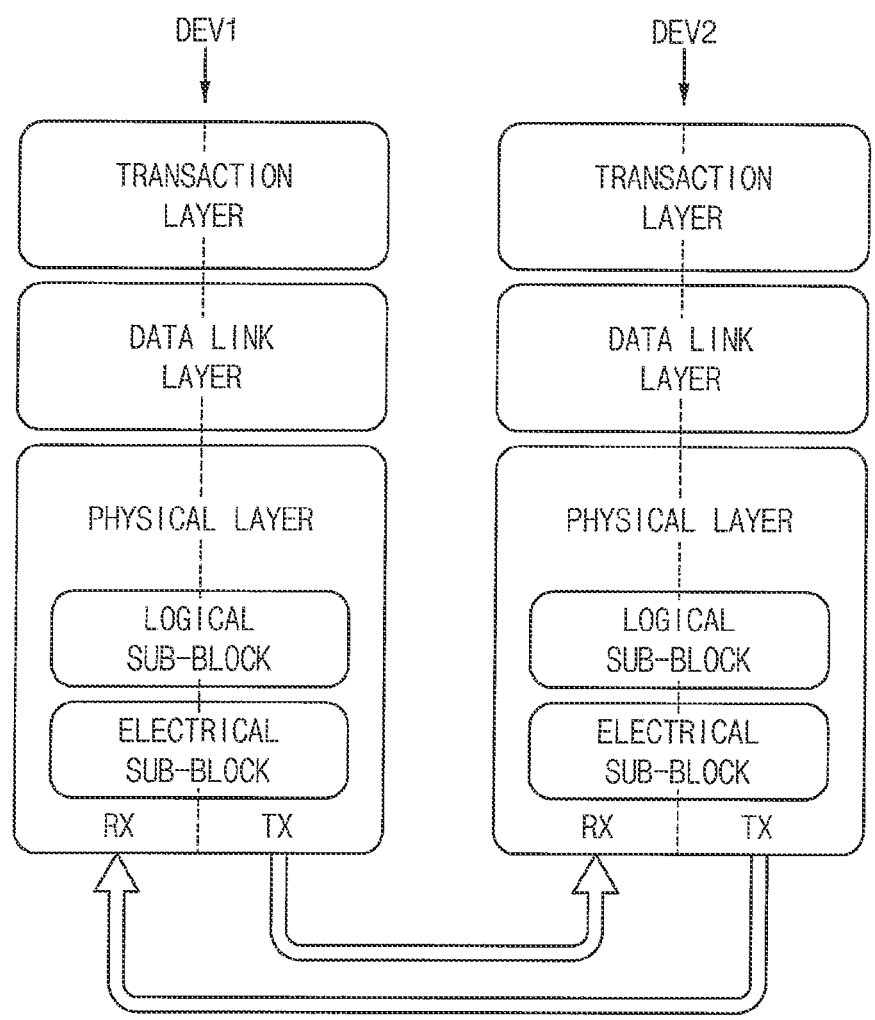
FIGS. 4 and 5 are diagrams illustrating an exemplary embodiment of an interconnect architecture applied to a system according to exemplary embodiments.
Figure 5:
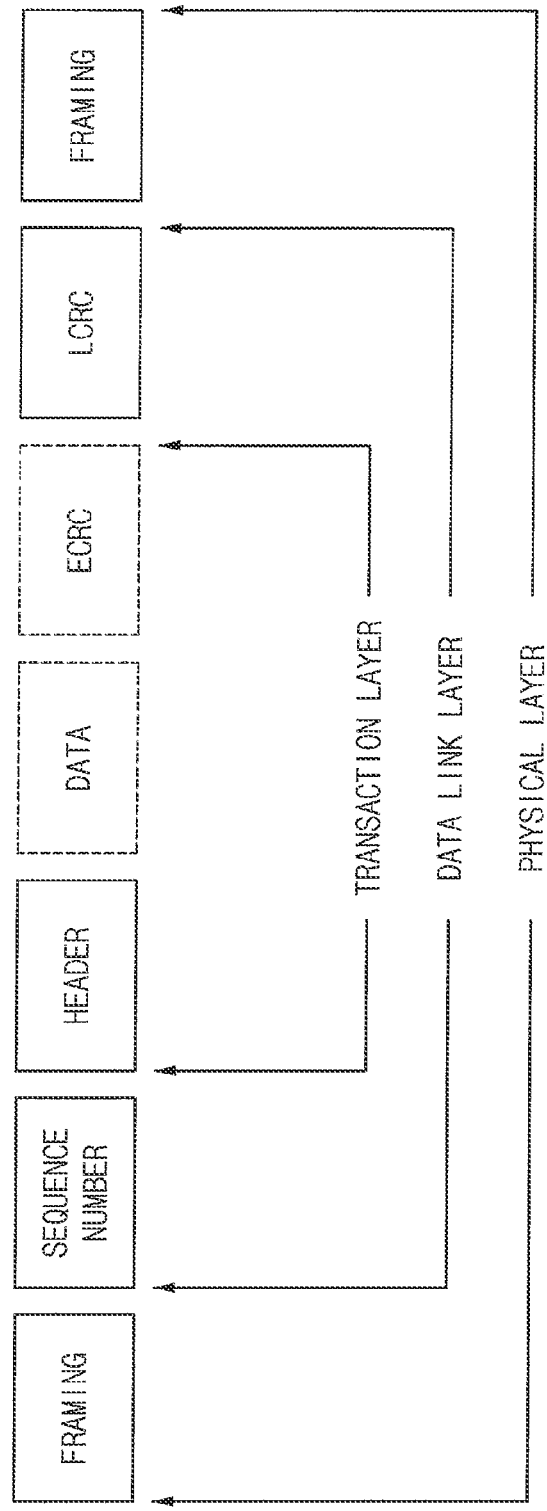

FIGS. 4 and 5 are diagrams illustrating an exemplary embodiment of an interconnect architecture applied to a system according to exemplary embodiments.

Referring to FIGS. 4 and 5, an exemplary embodiment of a layered protocol stack is illustrated. A layered protocol stack includes any form of a layered communication stack, such as a Quick Path Interconnect (QPI) stack, a PCIe stack, a next generation high performance computing interconnect stack, or other layered stack. Although exemplary embodiments are in relation to a PCIe stack, the same concepts may be applied to other interconnect stacks. In one exemplary embodiment, the protocol stack is a PCIe protocol stack including a transaction layer, a data link layer, and a physical layer. An interface, such as the interfaces 317, 318, 321, 322, 326, and 331 in FIG. 3, may be represented as a communication protocol stack. Representation as a communication protocol stack may also be referred to as a module or interface implementing/including a protocol stack.

The PCI Express uses packets to communicate information between components. The packets are formed in the transaction layer and the data Link Layer to carry the information from the transmitting component to the receiving component. As the transmitted packets flow through the other layers, they are extended with additional information necessary to handle packets at those layers. At the receiving side the reverse process occurs and packets get transformed from their physical layer representation to the data link layer representation and finally (for transaction layer packets) to the form that may be processed by the transaction layer of the receiving device.

In one exemplary embodiment, the transaction layer is used to provide an interface between a device's processing core and the interconnect architecture, such as the data link layer and the physical layer. In this regard, a primary responsibility of the transaction layer is the assembly and disassembly of packets (i.e., the transaction layer packets, or TLPs). The transaction layer typically manages credit-based flow control for TLPs. The PCIe implements split transactions, i.e. transactions with a request and response separated by time, allowing a link to carry other traffic while the target device gathers data for the response.

In addition the PCIe utilizes credit-based flow control. In this scheme, a device advertises an initial amount of credit for each of the receive buffers in the transaction layer. An external device at the opposite end of the link, such as the controller hub 315 in FIG. 3, counts the number of credits consumed by each TLP. A transaction may be transmitted if the transaction does not exceed a credit limit. Upon receiving a response, an amount of credit is restored. An advantage of a credit scheme is that the latency of credit return does not affect performance, provided that the credit limit is not encountered.

In one exemplary embodiment, the transaction layer assembles packet header/payload. The payload may include data and an error detection code, i.e. ECRC. Formats for current packet headers/payloads may be found in the PCIe specification at the PCIe specification website.

The link layer, also referred to as the data link layer, acts as an intermediate stage between the transaction layer and the physical layer or the PHY layer. In one exemplary embodiment, a responsibility of the data link layer is providing a reliable mechanism for exchanging the transaction layer packets (TLPs) between two components through a link. One side of the data link layer accepts TLPs assembled by the transaction layer, applies a packet sequence identifier, i.e. a sequence number, an identification number or a packet number, calculates and applies an error detection code, i.e. LCRC, and submits the modified TLPs to the physical layer for transmission across a physical layer to an external device.

In one exemplary embodiment, the physical layer includes a logical sub block and an electrical sub-block to physically transmit a packet to an external device. Here, the logical sub-block is responsible for the "digital" functions of the physical layer. In this regard, the logical sub-block includes a transmitter section to prepare outgoing information for transmission by the physical sub-block, and a receiver section to identify and prepare received information before passing it to the link layer.

The physical block includes a transmitter TX and a receiver RX. The transmitter TX is supplied by the logical sub-block with symbols, which the transmitter serializes and transmits onto to an external device. The receiver RX is supplied with serialized symbols from an external device and transforms the received signals into a bit-stream. The bit-stream is de-serialized and supplied to the logical sub-block. In one exemplary embodiment, an 8*b*/10*b* transmission code is employed, where ten-bit symbols are transmitted/received. Here, special symbols are used to frame a packet with frames. In addition, in one example, the receiver RX also provides a symbol clock recovered from the incoming serial stream.

As stated above, although the transaction layer, the link layer, and physical layer are discussed in reference to a specific embodiment of a PCIe protocol stack, a layered protocol stack is not so limited. In fact, any layered protocol may be included/implemented.

Figure 6:
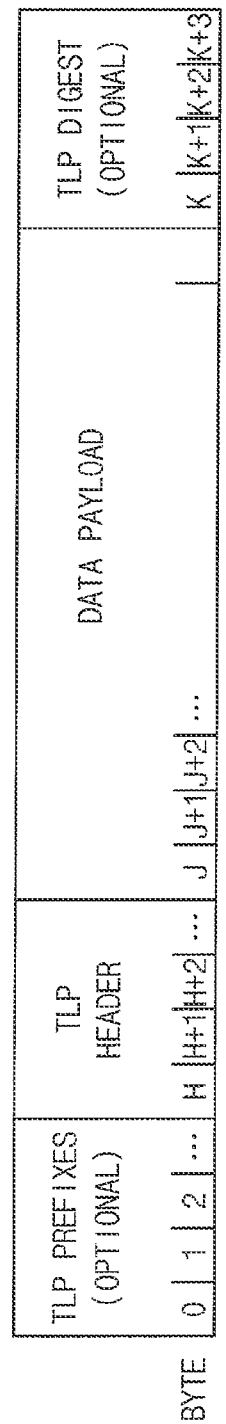
FIGS. 6, 7 and 8 are diagrams packets that are transferred between a transmission device and reception device included in a system according to exemplary embodiments.
Figure 7:
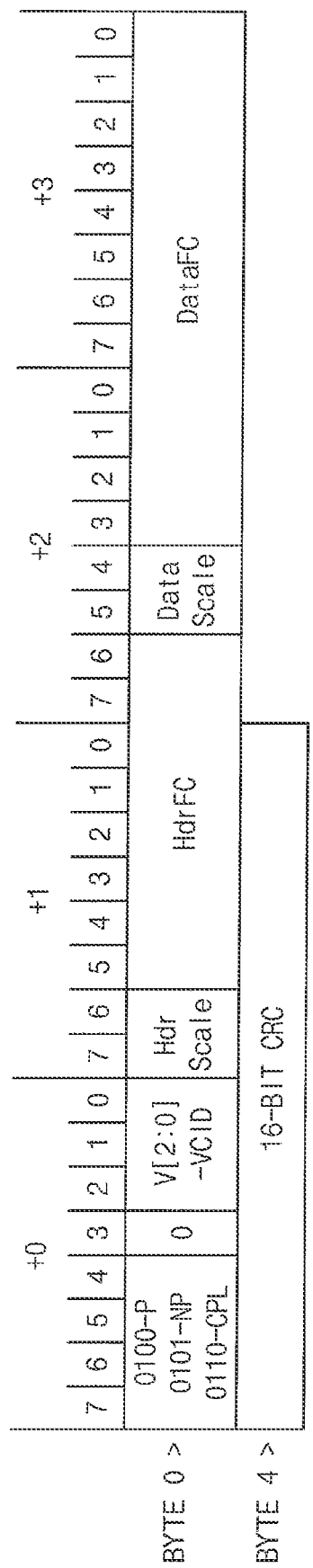
Figure 8:
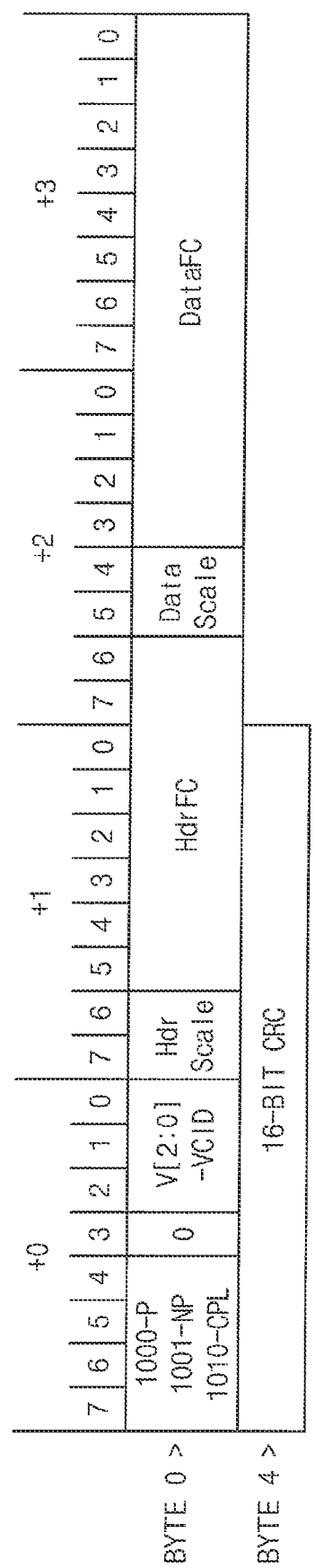

FIGS. 6, 7 and 8 are diagrams packets that are transferred between a transmission device and reception device included in a system according to exemplary embodiments.

FIG. 6 illustrates a format of a transaction layer packet (TLP) that is generated and managed by the transaction layer of the PCIe architecture.

The Transactions consists of requests and completions, which are communicated using packets. As illustrated in FIG. 6, a TLP may include one or more optional TLP Prefixes, a TLP header, a data payload, and an optional TLP Digest, which are assigned to a plurality of bytes (BYTE 0~k+3).

FIGS. 7 and 8 illustrate formats of flow control layer packets that are generated and managed by the data link layer of the PCIe architecture. FIG. 7 illustrates an initial flow control packet InitFC and FIG. 8 illustrates an update flow control packet UpdateFC.

The flow control information on the occupation state of the reception buffer may be transferred using the initial flow control packet InitFC and the update flow control packet UpdateFC, which correspond to a type of a data link layer packet DLLP. As illustrated in FIGS. 7 and 8, the initial flow control packet InitFC and the update flow control packet UpdateFC may include fields such as a credit type (P, NP or CPL), a virtual channel identifier (VCID), a header scale (HdrScale), a header credit (HdrFC), a data scale (DataScale), a data credit (DataFC), and a cyclical redundancy code (CRC). The credit type may include a post request type (P), a non-posted request type (NP) and a completion type (CPL).

The PCIe components such as a host device and a storage device may exchange information on the respective reception buffers using the initial flow control packet InitFC during system initialization. In an aspect of the storage device, the storage device receives, from the host device, information on the allocated size of the port to which the storage device is attached. After that, the storage device updates a consumed credit CC whenever the host device transmits a transaction layer packet (TLP). The host device updates an allocated credit AC whenever the host device transfers the TLP from the reception buffer to the higher layer. The host device may provide the allocated credit AC using the update flow control packet UpdateFC, and the storage device may update a limit credit LC based on the allocated credit AC. The storage device may determine whether a storage space of the reception buffer of host device is insufficient to store the transaction layer packets, based on a difference between the limit credit LC and the consumed credit CC. The storage device may block transmission of the TLPs to the host device when the transmission flow controller of the storage device determines that the storage space of the reception buffer of the host device is insufficient to store the transaction layer packets. After that, the storage device may transfer the TLPs to the host device if the limit credit LC is increased by the update flow control packet UpdateFC transferred from the host device.

Figure 9:
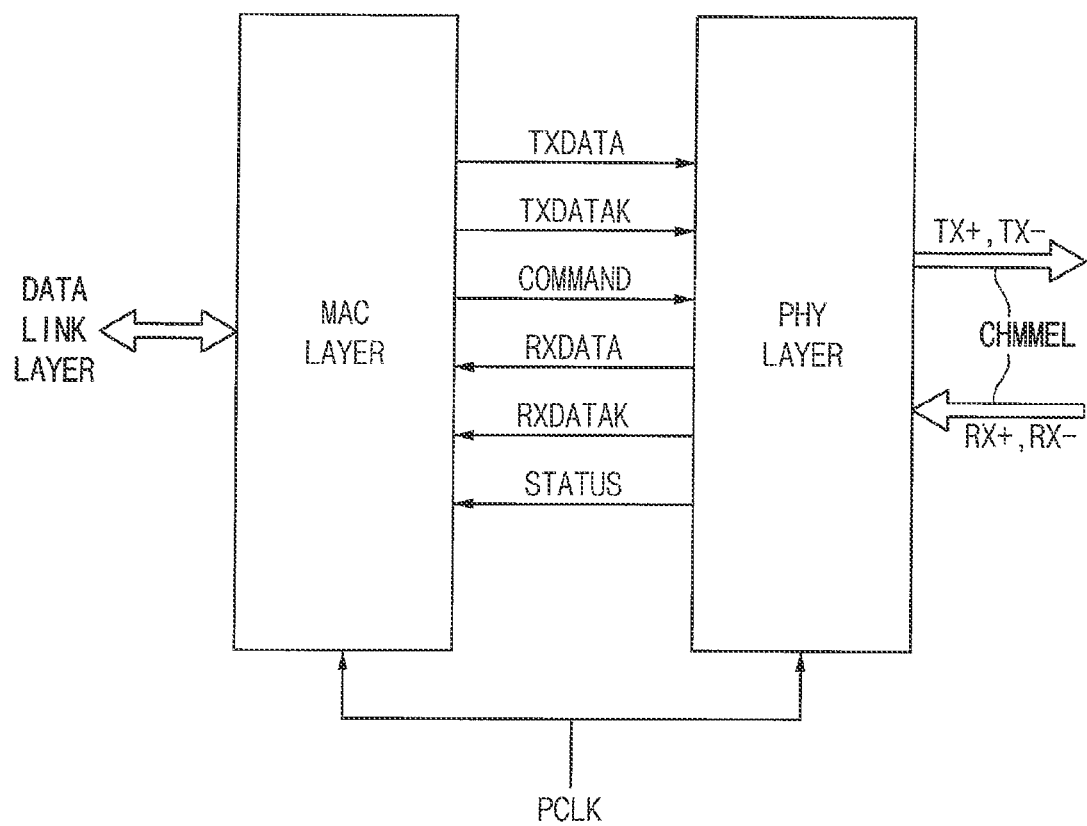
FIG. 9 is a diagram illustrating an exemplary embodiment of a PHY-MAC interface applied to a system according to exemplary embodiments.

FIG. 9 is a diagram illustrating an exemplary embodiment of a PHY-MAC interface applied to a system according to exemplary embodiments.

FIG. 9 illustrates a PHY-MA interface according to a PIPE (PHY Interface for PCI Express) standards. As illustrated in FIG. 9, each of a transmission device and a reception device may include an interface between a MAC (media access) layer and a PHY layer. The MAC layer is connected to the higher layer including the data link layer, while the PHY layer may be coupled to a physical interconnect, e.g., by differential signal pairs in the transmit and receive directions.

Various signaling occurs between the MAC layer and the PHY layer. In general, data TXDATA and data/control signals TXDATAK to be transmitted from a device is sent from the MAC layer to the PHY layer along with a variable amount of command signals COMMAND. The PHY layer transfers a differential signal pair TX+ and TX− corresponding to the data TXDATA to the channel. In turn, for incoming data received by the device, the PHY layer communicates parallel data as RX data RXDATA with corresponding data/control information RXDATAK. In addition, status information STATUS of a variable length may be communicated.

The internal clock signal or the PIPE clock signal PCLK may be used for synchronization of signal transfer between the MAC layer and the PHY layer. FIG. 9 illustrates that the PIPE clock signal is provided from outside the MAC layer and the PHY layer, but exemplary embodiments are not limited thereto.

Figure 10:
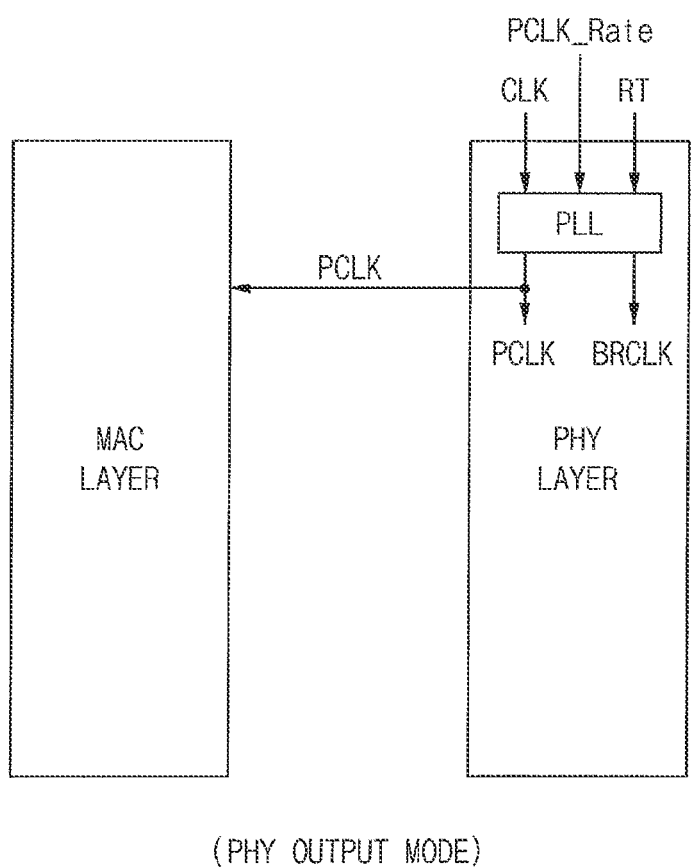
FIGS. 10, 11 and 12 are diagrams illustrating exemplary embodiments of synchronization using an internal clock signal in a system according to exemplary embodiments.
Figure 11:
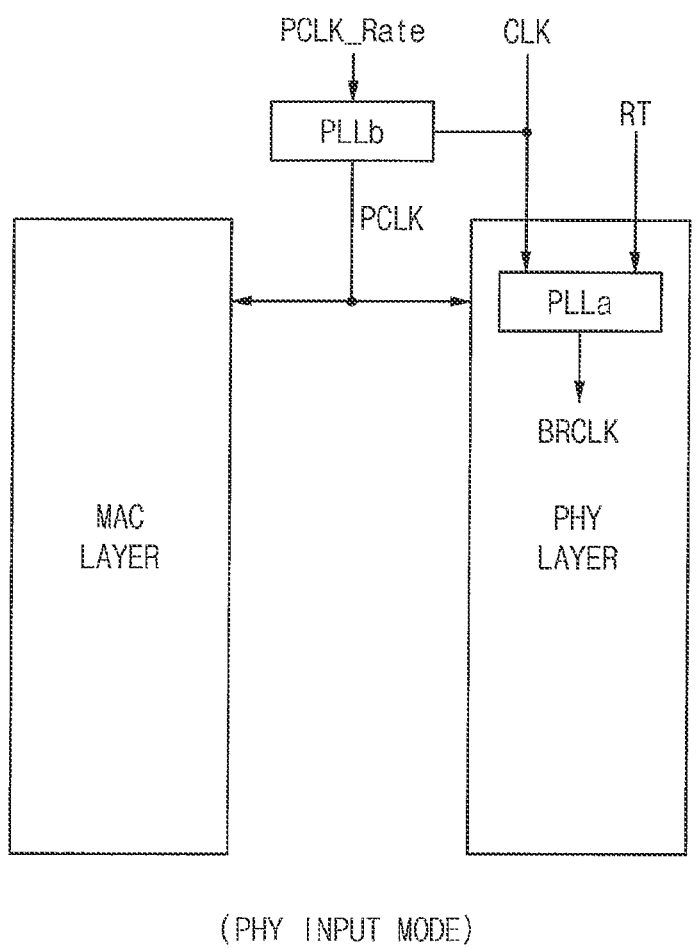
Figure 12:
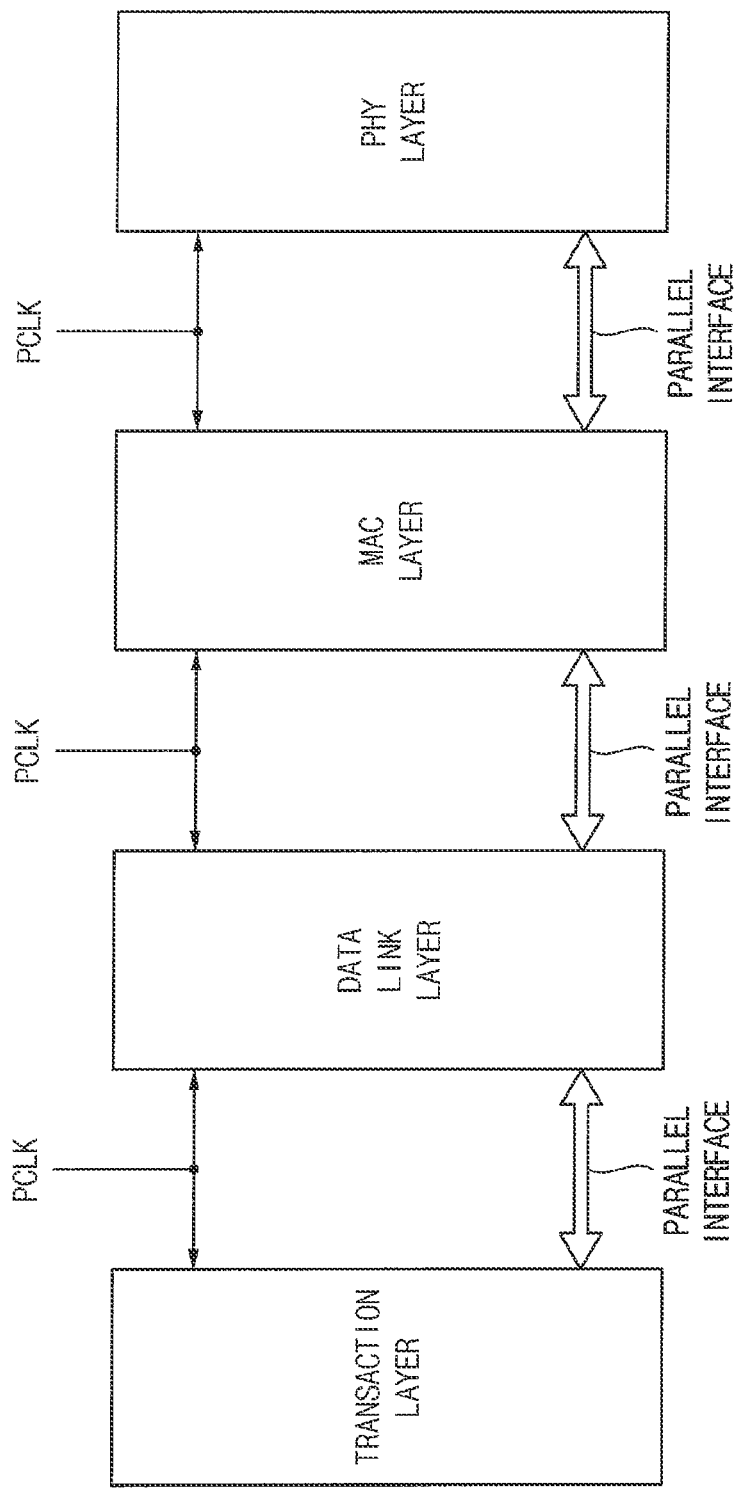

FIGS. 10, 11 and 12 are diagrams illustrating exemplary embodiments of synchronization using an internal clock signal in a system according to exemplary embodiments.

FIG. 10 illustrates a configuration corresponding to a PHY output mode. Referring to FIG. 10, a phase-locked loop PLL included in a PHY layer may generate a PIPE clock signal PCLK and a bit rate clock signal BRCLK based on a reference clock signal CLK. The PIPE signal PCLK may be used to synchronize signal transfer between the PHY layer and an internal logic circuit of a MAC layer, and the bit rate clock signal BRCLK may be used to control transfer speed between the transmission device and the reception device. As such, the PIPE clock signal PCLK may be generated in the PHY layer and transferred to the internal logic circuit of the MAC layer.

FIG. 11 illustrates a configuration corresponding to a PHY input mode. Referring to FIG. 11, a phase-locked loop PLLa included in a PHY layer may generate a bit rate clock signal BRCLK based on a reference clock signal CLK, and a phase-locked loop PLLb disposed out of the PHY layer may generate and a PIPE clock signal PCLK based on the reference clock signal CLK. As such, the PIPE clock signal PCLK may be generated outside the PHY layer and transferred to the PHY layer and the internal logic circuit of the MAC layer.

Each of the phase-locked loops PLL and PLLb may control the frequency of the PIPE clock signal PCLK based on a control value PCLK_Rate and control the frequency of the bit rate clock signal BRCLK based on a control value RT. The control value RT for the bit rate clock signal BRCLK may be controlled at the system level to synchronize the PHY layers of the transmission device and the reception device. In contrast, the control value PCLK_Rate for the PIPE clock signal PCLK may be controlled by the dynamic frequency controller included in a system according to exemplary embodiments. The dynamic frequency controller included in the transmission device may increase the frequency of the internal clock signal, that is, the PIPE clock signal PCLK to increase a speed of a flow control update operation by the transmission device when a transfer delay from the transmission device to the reception device occurs, regardless of the frequency of the bit rate clock signal BRCLK.

Referring to FIG. 12, the transaction layer, the data link layer, the MAC layer and the PHY layer may be implemented as hardware blocks that are connected through parallel interfaces. The PIPE clock signal PCLK may be provided to the hardware blocks for synchronization of signal transfer between the hardware blocks.

For example, the dynamic frequency controller according to exemplary embodiments may determine that a flow delay state occurs if the number of the pending transaction layer packets stored in the transmission buffer is equal to or greater than one (that is, the transmission buffer is not empty) and the transmission flow controller blocks the transmission of the transaction layer packets to the host device. Even though the update flow control packet UpdateFC including the increased allocated credit AC is received from the reception device during the flow delay state, the transfer of the pending transaction layer packet may be delayed due to the time delay for updating the limit credit LC. The flow control according to PCIe is performed by the transaction layer and the transfer delay may be increased in case of a multi-stage structure as illustrated in FIG. 12. According to exemplary embodiments, the transfer delay may be reduced by increasing the frequency of the PIPE clock signal PCLK when the flow delay state occurs.

FIG. 13 is a diagram illustrating a frequency of an internal clock signal specified by PIPE (PHY Interface for PCI Express) standards, and FIG. 14 is a diagram illustrating an exemplary embodiment of setting a plurality of step frequencies of an internal clock signal in a system according to exemplary embodiments.

FIG. 13 illustrates the frequency of the PIPE clock signal with respect to phases Phases1~Phases4 of the first generation Gen1 through the sixth generation Gen6 of PCIe. The PCIe transfer speed is represented by giga transfer per second (GT/s) and the frequency of the PIPE clock signal is represented by mega Hertz (MHz).

FIG. 14 illustrates an exemplary embodiment of setting the frequency of the PIPE clock signal PCLK corresponding to the above-mentioned internal clock signal to a plurality of step frequencies, that is, 62.5 MHz, 125 MHz, 250 MHz, 500 MHz, 1000 MHz, 2000 MHz, and 4000 MHz. The step frequencies may be set variously according to operation environment of the system, PCIe specifications, and so on.

The control value PCLK_Rate for controlling the frequency of the PIPE clock signal PCLK may be represented by multiple bits, for example, five bits [4:0]. The phase-locked loop may be configured to generate the PIPE clock signal PCLK having the frequency corresponding to the control value PCLK_Rate. In the exemplary embodiment of FIG. 14, the control value PCLK_Rate of 00000 corresponds to the minimum frequency of 62.5 MHz and the control value PCLK_Rate of 00111 corresponds to the maximum frequency of 4000 MHz. Hereinafter, exemplary embodiments are described based on the setting of step frequencies in FIG. 14.

Figure 15:
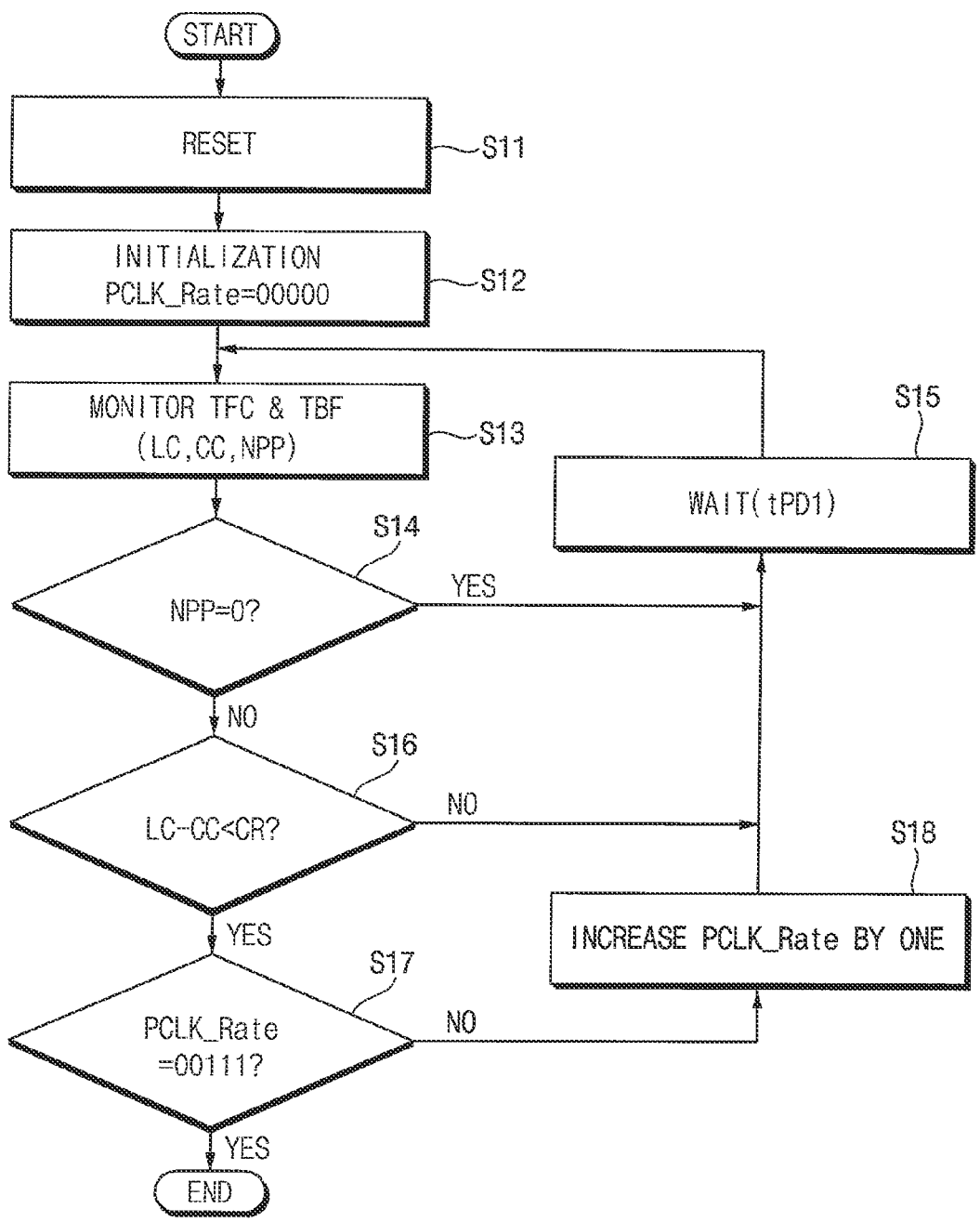
FIG. 15 is a flow chart illustrating an exemplary embodiment of increasing a frequency of an internal clock signal in a system according to exemplary embodiments.

FIG. 15 is a flow chart illustrating an exemplary embodiment of increasing a frequency of an internal clock signal in a system according to exemplary embodiments.

Referring to FIG. 15, the link may be reset (S11) when the system is powered on, an error occurs, and so on.

After the reset of the link is completed, the frequency of the internal clock signal PCLK may be initialized to the minimum frequency among the plurality of step frequencies (S12). In other words, the control value PCLK_Rate may be initialized to 00000 corresponding to the minimum frequency.

The dynamic frequency controller DFC may monitor the state of the transmission buffer TBF and the state of the transmission flow controller TFC (S13). In some exemplary embodiments, the dynamic frequency controller DFC may monitor the number NPP of the pending transaction layer packets, which corresponds to the state of the transmission buffer, and monitor the limit credit LC and the consumed credit CC, which correspond to the state of the transmission flow controller TFC.

When the number NPP of the pending transaction layer packets is zero (S14: YES), that is, when the pending transaction layer packet does not exist in the transmission buffer TBF, the dynamic frequency controller DFC may wait for a first cycle period tPD1 (S15) and monitor the state of the transmission buffer TBF and the state of the transmission flow controller TFC (S13).

When the number NPP of the pending transaction layer packets is not zero (S14: NO) and when the difference LC-CC between the limit credit LC and the consumed credit CC is not smaller than a reference credit CR (S16: NO), the dynamic frequency controller DFC may wait for the first cycle period tPD1 (S15) and monitor the state of the transmission buffer TBF and the state of the transmission flow controller TFC (S13).

When the number NPP of the pending transaction layer packets is not zero (S14: NO) and when the difference LC-CC between the limit credit LC and the consumed credit CC is smaller than the reference credit CR (S16: YES), the dynamic frequency controller DFC may determine that a flow delay state occurs. When the flow delay state occurs and the present control value PCLK_Rate is not 00111 corresponding to the maximum frequency among the plurality of step frequencies (S17: NO), the dynamic frequency controller DFC may increase the control value PCLK_Rate by one (S18). As such, the dynamic frequency controller DFC may increase the frequency of the internal clock signal PCLK by one step. After that, the dynamic frequency controller DFC may wait for the first cycle period tPD1 (S15) and monitor the state of the transmission buffer TBF and the state of the transmission flow controller TFC (S13).

As such, the dynamic frequency controller DFC may determine periodically by the first cyclic period tPD1 whether the flow delay state occurs and increase the frequency of the internal clock signal PCLK step by step until the frequency reaches the maximum frequency (S17: YES). After the frequency reaches the maximum frequency, the frequency of the internal clock signal PCLK may be maintained at the maximum frequency until the link is reset again.

Figure 16:
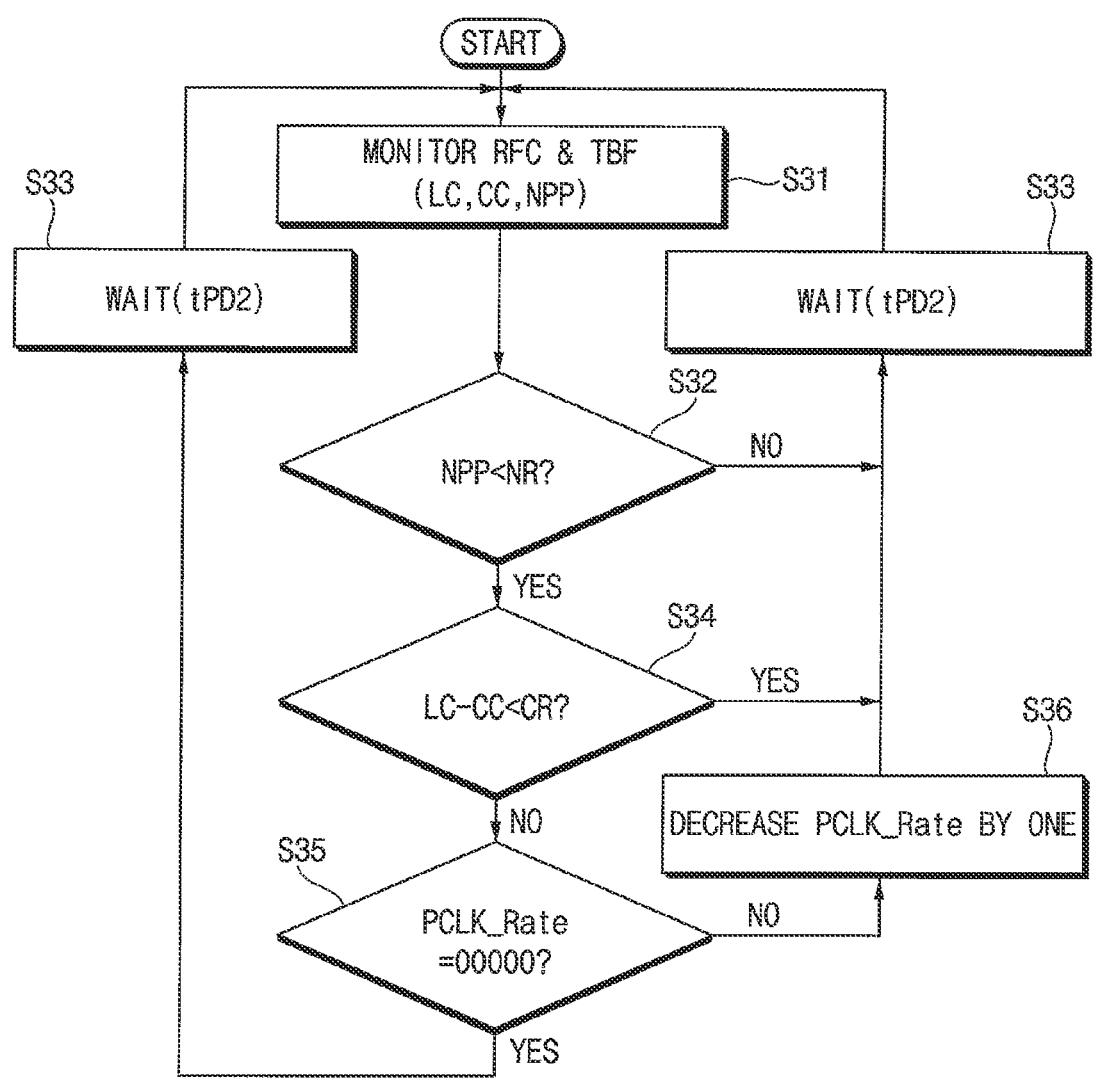
FIG. 16 is a flowchart illustrating an exemplary embodiment of decreasing a frequency of an internal clock signal in a system according to exemplary embodiments.

FIG. 16 is a flowchart illustrating an exemplary embodiment for decreasing a frequency of an internal clock signal in a system according to exemplary embodiments.

Referring to FIG. 16, the dynamic frequency controller DFC may monitor the state of the transmission buffer TBF and the state of the transmission flow controller TFC (S31). In some exemplary embodiments, the dynamic frequency controller DFC may monitor the number NPP of the pending transaction layer packets, which corresponds to the state of the transmission buffer, and monitor the limit credit LC and the consumed credit CC, which correspond to the state of the transmission flow controller TFC.

When the number NPP of the pending transaction layer packets is not smaller than a reference number NR (S32: NO), the dynamic frequency controller DFC may wait for a second cycle period tPD2 (S33) and monitor the state of the transmission buffer TBF and the state of the transmission flow controller TFC (S31).

When the number NPP of the pending transaction layer packets is smaller than the reference number NR (S14: YES) and when the difference LC-CC between the limit credit LC and the consumed credit CC is smaller than a reference credit CR (S34: YES), the dynamic frequency controller DFC may wait for the second cycle period tPD2 (S33) and monitor the state of the transmission buffer TBF and the state of the transmission flow controller TFC (S31).

When the number NPP of the pending transaction layer packets is smaller than the reference number NR (S14: YES) and when the difference LC-CC between the limit credit LC and the consumed credit CC is not smaller than the reference credit CR (S34: NO), the dynamic frequency controller DFC may determine that a smooth flow state occurs. When a smooth flow state occurs and the present control value PCLK_Rate is not 00000 corresponding to the minimum frequency among the plurality of step frequencies (S35: NO), the dynamic frequency controller DFC may decrease the control value PCLK_Rate by one (S36). As such, the dynamic frequency controller DFC may decrease the frequency of the internal clock signal PCLK by one step. After that, the dynamic frequency controller DFC may wait for the second cycle period tPD2 (S33) and monitor the state of the transmission buffer TBF and the state of the transmission flow controller TFC (S31).

As such, the dynamic frequency controller DFC may determine periodically by the second cyclic period tPD2 whether the smooth flow state occurs and decrease the frequency of the internal clock signal PCLK step by step until the frequency reaches the minimum frequency (S35: YES). When the frequency of the internal clock signal PCLK corresponds to the minimum frequency (S35: YES), the dynamic frequency controller DFC may wait for the second cycle period tPD2 (S33) and monitor the state of the transmission buffer TBF and the state of the transmission flow controller TFC (S31).

Figure 17A:
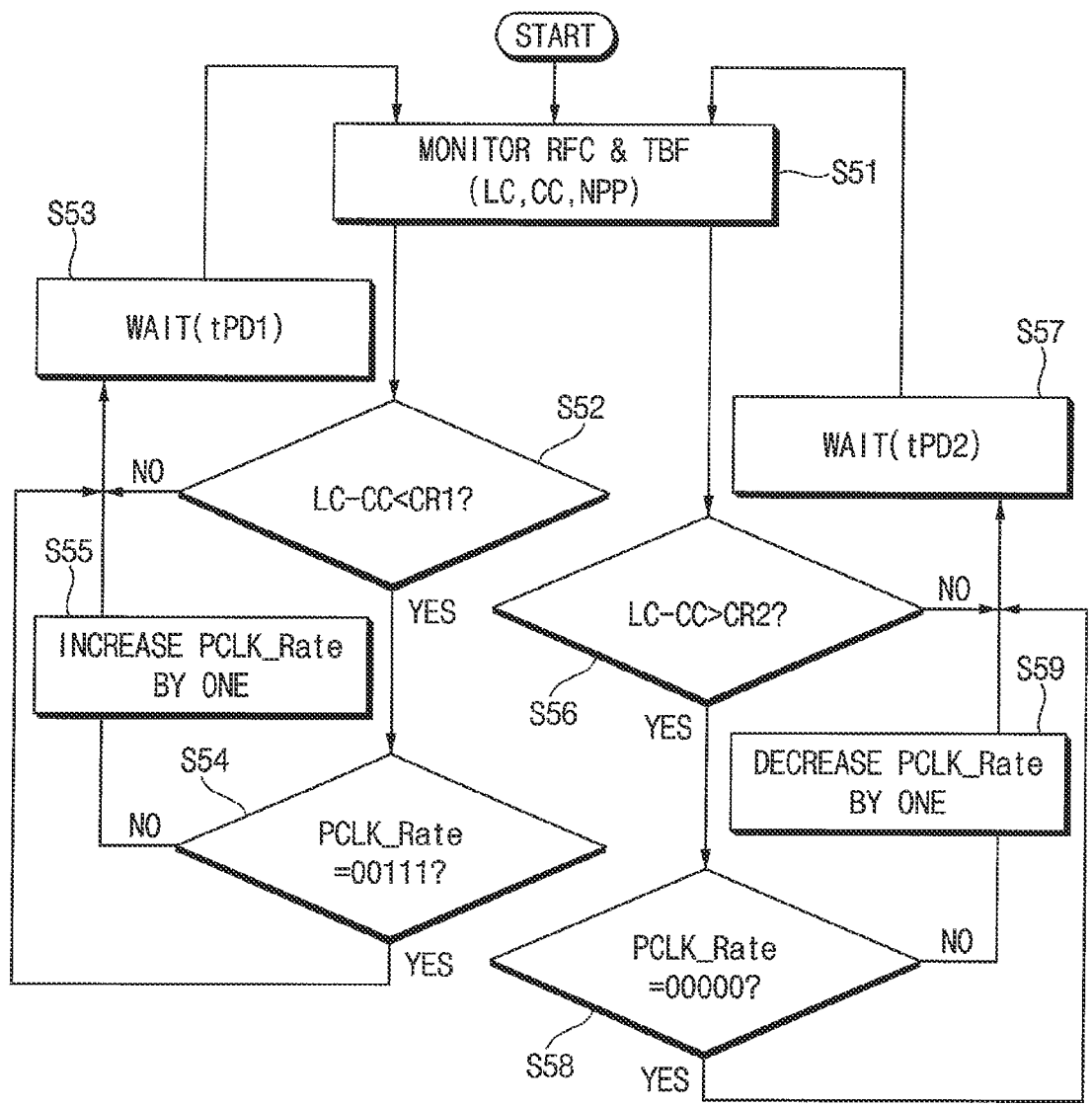
FIGS. 17A and 17B are diagrams illustrating an exemplary embodiment of controlling a frequency of an internal clock signal in a system according to exemplary embodiments.
Figure 17B:
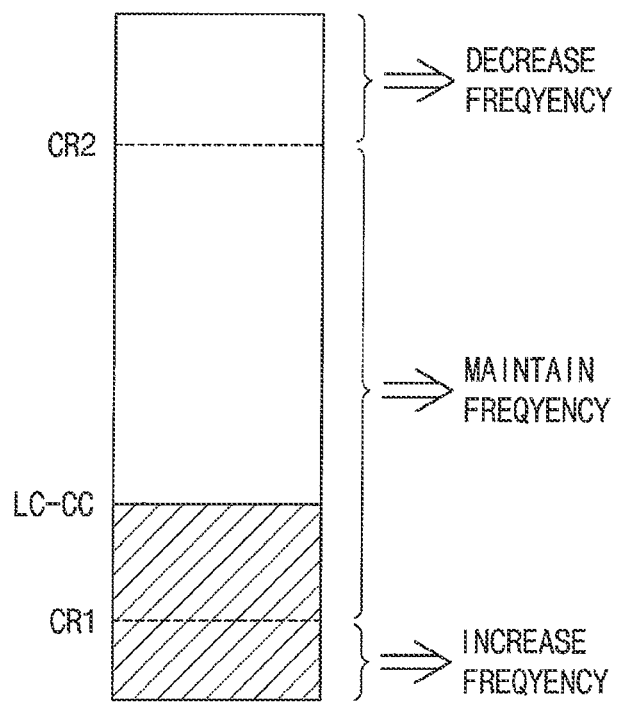

FIGS. 17A and 17B are diagrams illustrating an exemplary embodiment of controlling a frequency of an internal clock signal in a system according to exemplary embodiments.

Referring to FIGS. 17A and 17B, the dynamic frequency controller DFC may monitor the state of the transmission buffer TBF and the state of the transmission flow controller TFC (S51). In some exemplary embodiments, the dynamic frequency controller DFC may monitor the number NPP of the pending transaction layer packets, which corresponds to the state of the transmission buffer, and monitor the limit credit LC and the consumed credit CC, which correspond to the state of the transmission flow controller TFC.

When the difference LC-CC between the limit credit LC and the consumed credit CC is not smaller than a first reference credit CR1 (S52: NO), the dynamic frequency controller DFC may wait for a first cycle period tPD1 (S53) and monitor the state of the transmission buffer TBF and the state of the transmission flow controller TFC (S51).

When the difference LC-CC between the limit credit LC and the consumed credit CC is smaller than the first reference credit CR1 (S52: YES), the dynamic frequency controller DFC may determine that a flow delay state occurs. When the flow delay state occurs and the present control value PCLK_Rate is not 00111 corresponding to the maximum frequency among the plurality of step frequencies (S54: NO), the dynamic frequency controller DFC may increase the control value PCLK_Rate by one (S55). As such, the dynamic frequency controller DFC may increase the frequency of the internal clock signal PCLK by one step. After that, the dynamic frequency controller DFC may wait for the first cycle period tPD1 (S53) and monitor the state of the transmission buffer TBF and the state of the transmission flow controller TFC (S51).

When the difference LC-CC between the limit credit LC and the consumed credit CC is not greater than a second reference credit CR2 (S56: NO), the dynamic frequency controller DFC may wait for a second cycle period tPD2 (S57) and monitor the state of the transmission buffer TBF and the state of the transmission flow controller TFC (SM). As illustrated in FIG. 17b, the second reference credit CR2 may be set to be greater than the first reference credit CR1.

When the difference LC-CC between the limit credit LC and the consumed credit CC is greater than the second reference credit CR2 (S56: YES), the dynamic frequency controller DFC may determine that the smooth flow state occurs. When the smooth flow state occurs and the present control value PCLK_Rate is not 00000 corresponding to the minimum frequency among the plurality of step frequencies (S58: NO), the dynamic frequency controller DFC may decrease the control value PCLK_Rate by one (S59). As such, the dynamic frequency controller DFC may decrease the frequency of the internal clock signal PCLK by one step. After that, the dynamic frequency controller DFC may wait for the second cycle period tPD2 (S57) and monitor the state of the transmission buffer TBF and the state of the transmission flow controller TFC (S51).

As such, the dynamic frequency controller DFC may increase the frequency of the internal clock signal PCLK when the difference LC-CC between the limit credit LC and the consumed credit CC is smaller than the first reference credit CR1, and decrease the frequency of the internal clock signal PCLK when the difference LC-CC between the limit credit LC and the consumed credit CC is greater than the second reference credit CR2. When the difference LC-CC is between the first reference credit CR1 and the second reference credit CR2, the present frequency of the internal clock signal PCLK may be maintained.

Figure 18:
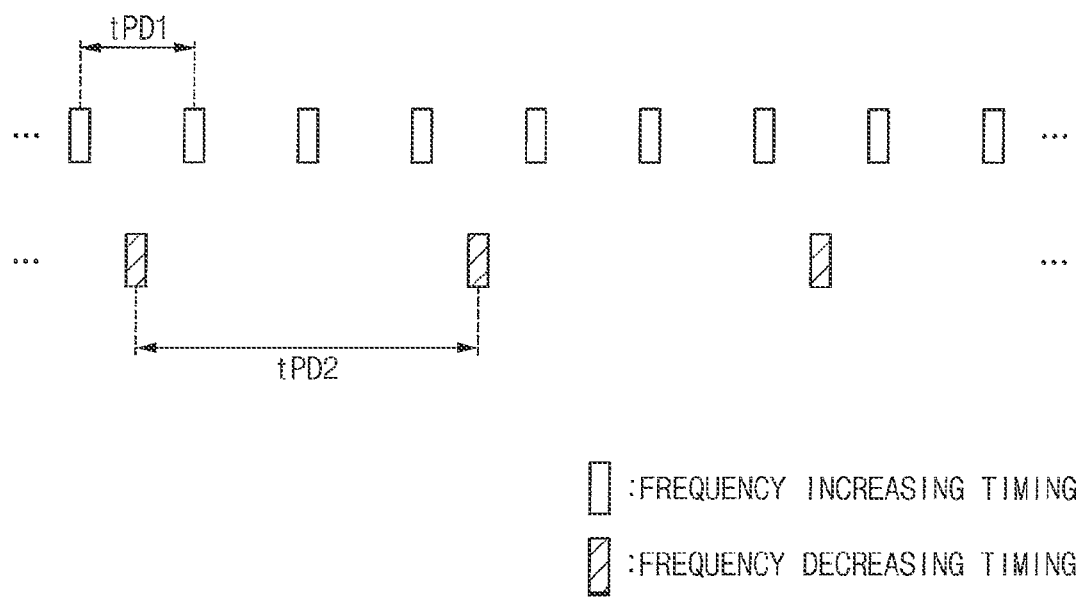
FIG. 18 is a diagram illustrating an example timing of controlling an internal clock signal in a system according to exemplary embodiments.

FIG. 18 is a diagram illustrating an exemplary timing for controlling an internal clock signal in a system according to exemplary embodiments.

In FIG. 18, the timings for determining whether to increase the frequency of the internal clock signal PCLK are represented by empty rectangles and the timings of determining whether to decrease the frequency of the internal clock signal PCLK are represented by hatched rectangles. As illustrated in FIG. 18, the dynamic frequency controller DFC may determine periodically by the first cyclic period tPD1 whether to increase the frequency of the internal clock signal PCLK, and determine periodically by the second cyclic period tPD2 longer than the first cyclic period tPD1 whether to decrease the frequency of the internal clock signal PCLK.

As the first cyclic period tPD1 is shortened, the performance of the transmission device may be enhanced but the power consumption may be increased. As the second cyclic period tPD2 is shortened, the power consumption may be decreased but the performance may be degraded. The performance enhancement may be considered first over the power reduction, by setting the first cyclic period tPD1 to be shorter than the second cyclic period tPD2.

Figure 19:
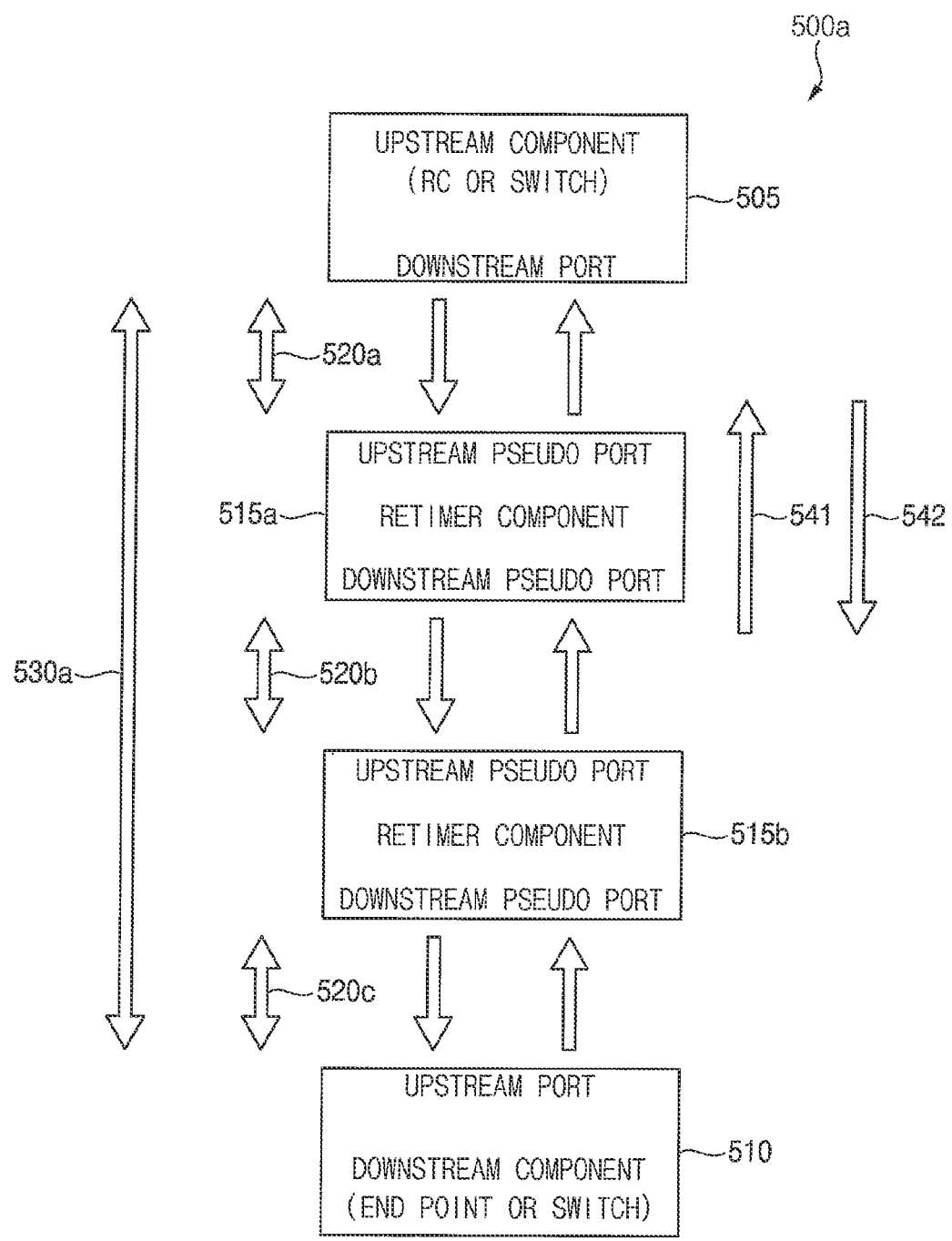
FIGS. 19 and 20 are block diagrams illustrating links including a retimer in a system according to exemplary embodiments.
Figure 20:
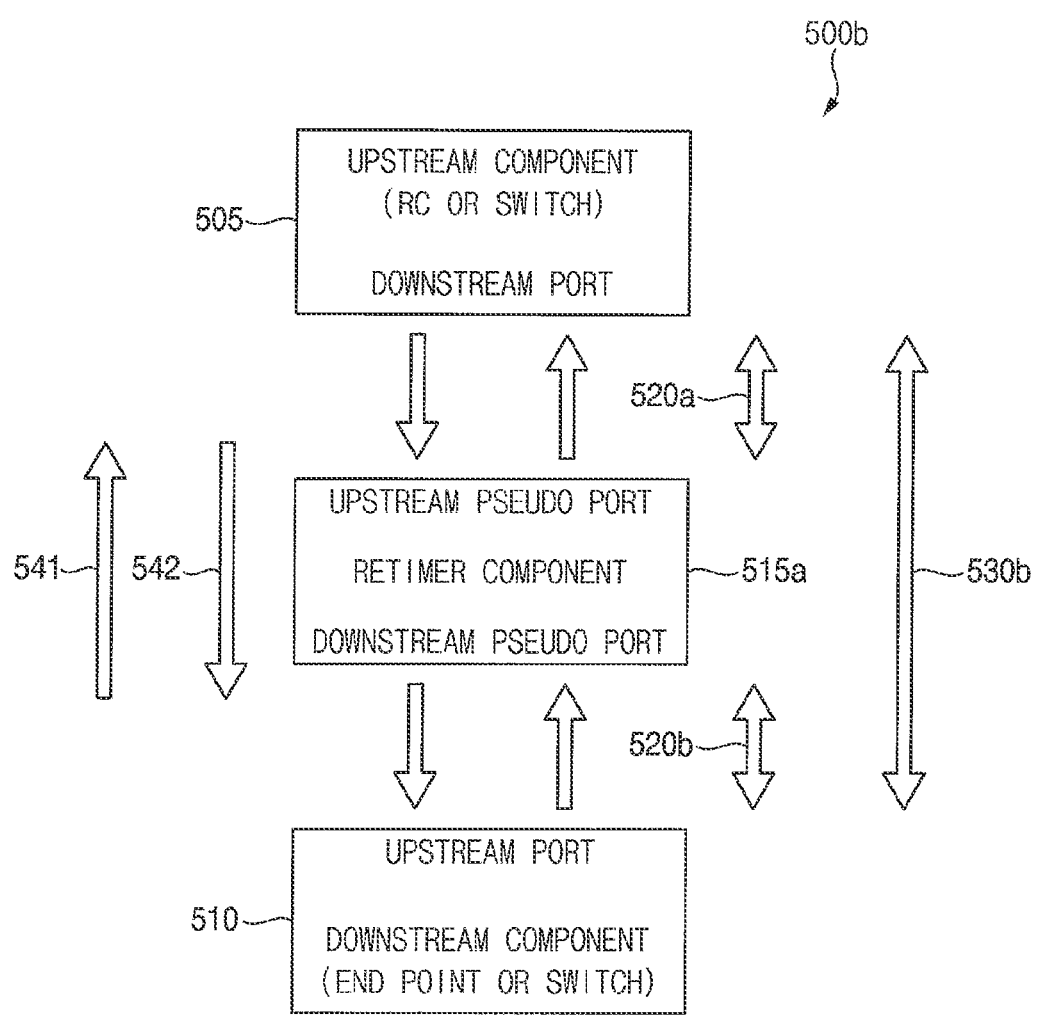

FIGS. 19 and 20 are block diagrams illustrating links including a retimer in a system according to exemplary embodiments.

As illustrated in FIG. 19, in a system 500a, multiple retimers 515a and 515b may be utilized to extend a link 530a. Three sublinks 520a, 520b and 520c may be defined through the two retimers 515a and 515b, with a first sublink 515a connecting a first component 505 (e.g., an upstream component) to the first retimer 515a, a second sublink connecting the first retimer 515a to the second retimer 515b, and the third sublink 515c connecting the second retimer 515b to a second component 510 (e.g., a downstream component).

As illustrated in FIG. 20, in a system 500b, a link 530b connecting the first component 505 to the second component 510 may include a single retimer 515a. A first sublink 520a may connect the first component 505 to the retimer 515a and a second sublink 520b may connect the retimer 515a to the second component.

As shown in the examples of FIGS. 19 and 20, a retimer may include two pseudo ports (downstream pseudo port and upstream pseudo port), and the pseudo ports may determine their respective downstream/upstream orientation dynamically. Each of the retimers 515a and 515b may have an upstream path and a downstream path. Further, the retimers 515a and 515b may support operating modes including a forwarding mode and an executing mode. The retimer 515a and 515b in some instances may decode data received on the sublink and re-encode the data that it is to forward downstream on its other sublink. In some cases, the retimers 515a and 515b may modify some values in the data it receives, such as when processing and forwarding ordered set data. Additionally, the retimers 515a and 515b may potentially support any width option as its maximum width, such as a set of width options defined by a specification such as PCIe.

Figure 21:
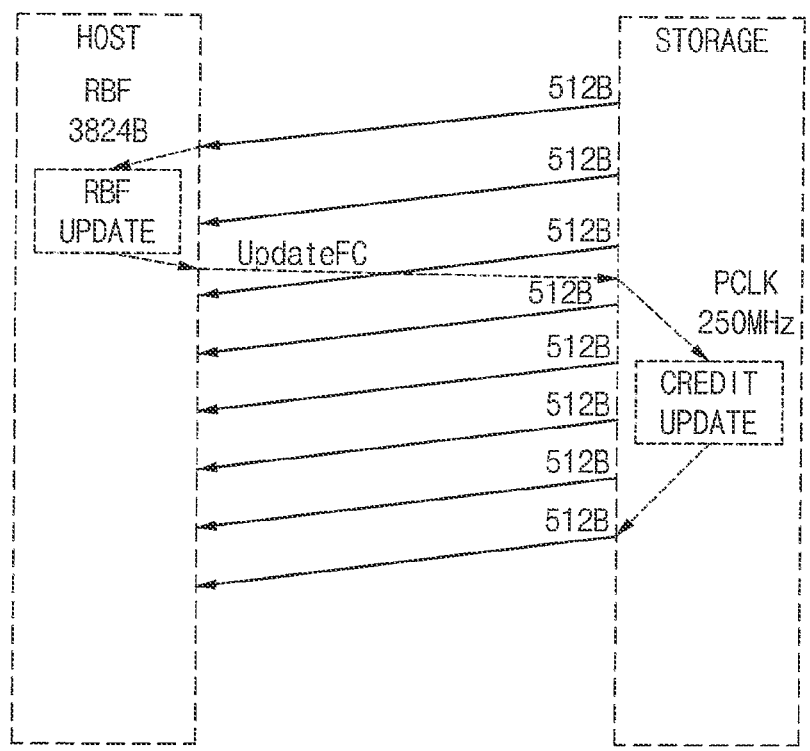
FIGS. 21, 22 and 23 are diagrams for describing transfer delay in a system according to exemplary embodiments.
Figure 22:
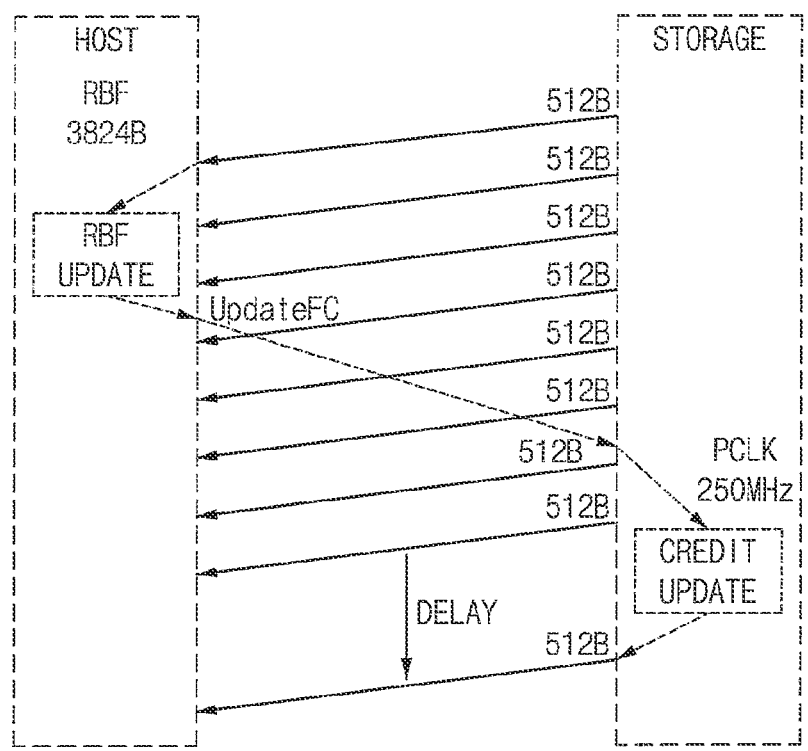
Figure 23:
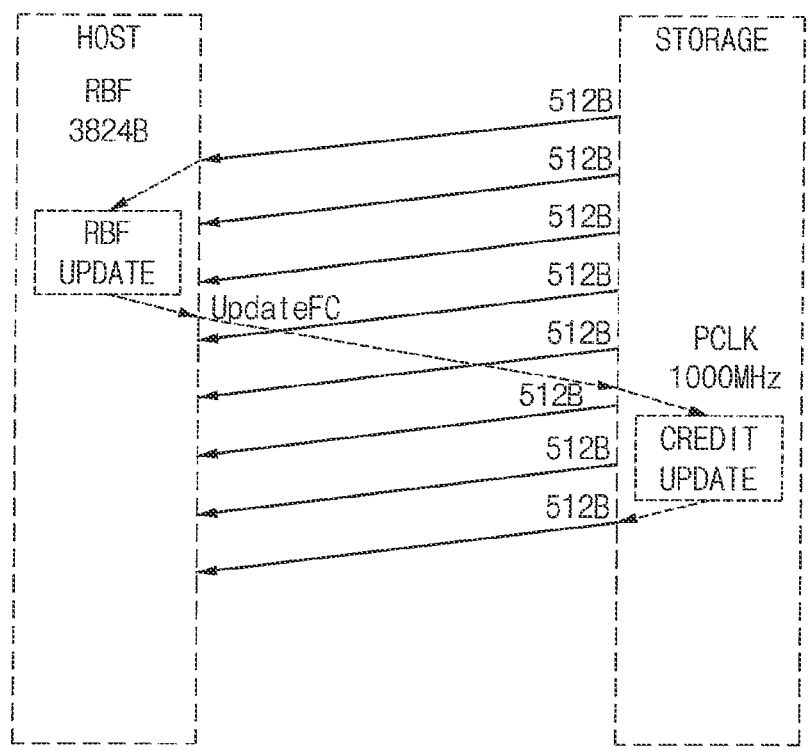

FIGS. 21, 22 and 23 are diagrams for describing transfer delay in a system according to exemplary embodiments.

Referring to FIGS. 21, 22 and 23, a host device may correspond to a reception device and a storage device may correspond to a transmission device. For example, the host device may include a reception buffer RBF of 3824 B (bytes) and the storage device may transfer transaction layer packets each including a data payload of 512 B. In other words, the maximum number of the transaction layer packets that may be stored in the reception buffer RBF may be seven.

If the seven transaction layer packets are stored in the reception buffer RBF, the storage device cannot transfer the eighth transaction layer packet to the host device. The storage device may transfer the eighth transaction layer packet after the update information is received through the update flow control packet UpdateFC from the host device. As such, the storage device has to wait for the flow control update information to send the eighth transaction layer packet and thus the performance of the storage device may be degraded.

FIG. 21 illustrates a case that the frequency of the internal clock signal PCLK is 250 MHz and there is no a retimer between the host device and the storage device. FIG. 22 illustrates a case that the frequency of the internal clock signal PCLK is 250 MHz and there exists a retimer between the host device and the storage device. FIG. 23 illustrates a case in which the frequency of the internal clock signal PCLK is 1000 MHz and there exists a retimer between the host device and the storage device.

Recent increases of the speed of PCIe cause degradation of signal integrity, and an integrated circuit such as a retimer is required to compensate for the degradation of signal integrity between the host device and the storage device.

In an environment in which the retimer is not disposed between the host device and the storage device as illustrated in FIG. 21, the storage device may process the update flow control packet UpdateFC and transfer the eighth transaction layer packet without delay even though the frequency of the internal clock signal PCLK is relatively as low as 250 MHz. In contrast, in an environment in which the retimer is included as illustrated in FIG. 22, the transfer delay occurs due to the retimer and the performance of the storage device may be degraded significantly. In this case, the transfer delay may be reduced or prevented by increasing the frequency of the internal clock signal PCLK up to 1000 MHz as illustrated in FIG. 23. If the frequency of the internal clock signal PCLK is fixed at the maximum frequency, the transfer delay may be reduced or prevented but power consumption is largely increased.

As described above, the power consumption of the transmission device (e.g., the storage device) and the transfer delay from the transmission device to the reception device (e.g., the host device) may be prevented or reduced by controlling the frequency of the internal clock signal of the transmission device based on the monitoring result of the state of the transmission buffer and the state of the transmission flow controller.

Figure 24:
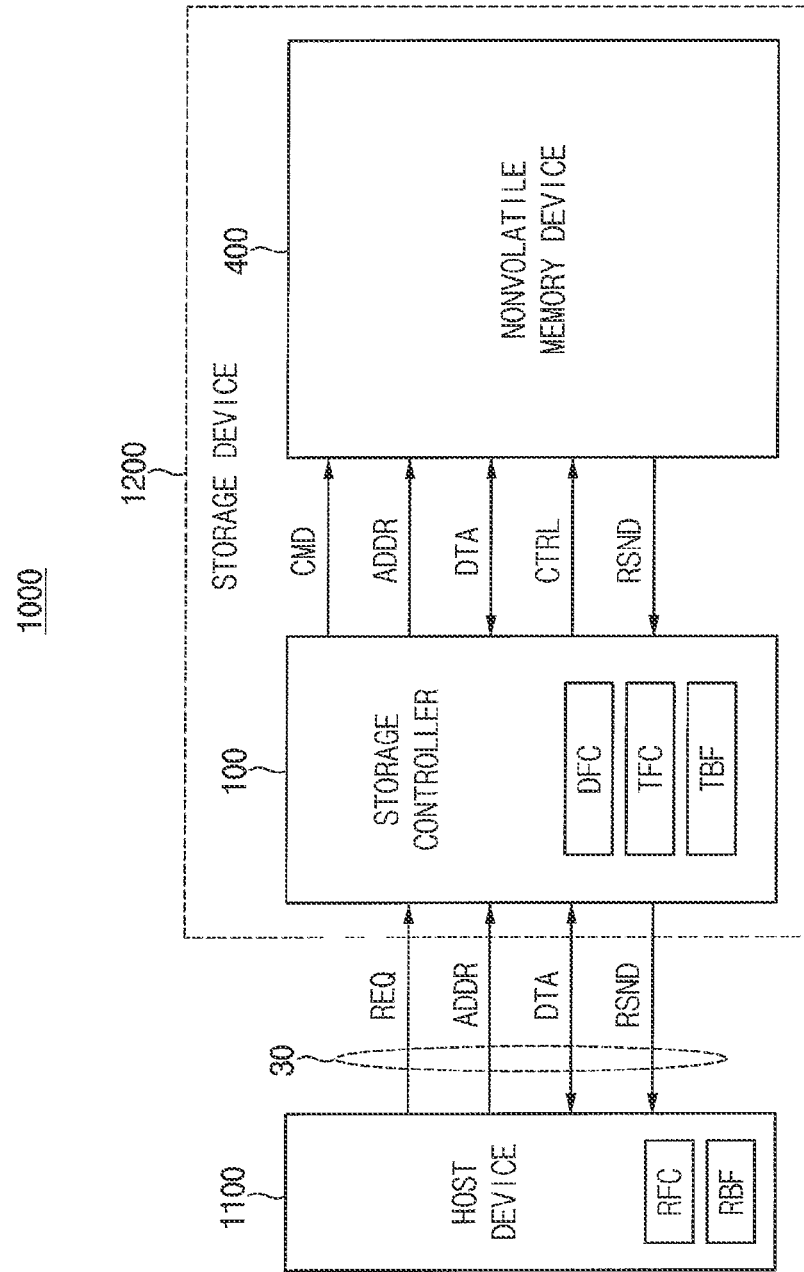
FIG. 24 is a block diagram illustrating a storage system according to exemplary embodiments.

FIG. 24 is a block diagram illustrating a storage system according to exemplary embodiments.

Referring to FIG. 24, a storage system 1000 may include a host device 1100, a storage device 1200 and a link 30 connecting the host device 1100 and the storage device 1200. The storage device 1200 may include a storage controller 100 and a nonvolatile memory device 400. The storage controller 100 may include a transmission buffer TRANSMISSION BUFFER, a transmission flow controller TFC and a dynamic frequency controller DFC. For example, the storage device 1200 may be a solid state drive (SSD), an embedded multimedia card (eMMC), a universal flash storage (UFS), or the like. The link 30 may be a PCIe link.

The host device 1100 may be or include a data processing device such as a central processing unit (CPU), a microprocessor, an application processor (AP), or the like. The storage device 1200 may be embedded with the host device 1100 in an electronic device, or the storage device 1200 may be detachable to an electronic device including the host device 1100.

The host device 1100 may transfer a data operation request (which may be referred to herein as simply a request) REQ and an associated address ADDR to the storage controller 100 to communicate data DTA with the storage controller 100. The storage controller 100 may transfer a response RSND to the request REQ to the host device 1100. The data operation request REQ may include a read request, a program request, and/or an erase request, respectively associated with one or more read operations, program operations, and/or erase operations. The program request may be referred to as a write request.

The storage controller 100 may control the nonvolatile memory device 400 based on the request REQ. The storage controller 100 may provide addresses ADDR, commands CMD, and control signals CTRL to perform the read operations, the program operations, and/or the erase operations. The program operation may be referred to as a write operation.

The storage controller 100 may control the nonvolatile memory device 400 to read data DTA stored in the nonvolatile memory device 400 in response to the read request received from the host device 1100. The storage controller 100 may control the nonvolatile memory device 400 to write or program data DTA in the nonvolatile memory device 400 in response to the write or program request received from the host device 1100. The storage controller 100 may control the nonvolatile memory device 400 to erase data stored in the nonvolatile memory device 400 in response to the erase request received from the host device 1100. The nonvolatile memory device 400 may transfer a response RSND to the storage controller 100 in response to the command CMD.

The nonvolatile memory device 400 may be implemented with nonvolatile memory such as flash memory, MRAM (Magnetic RAM), FeRAM (Ferroelectric RAM), PRAM (Phase change RAM), ReRAM (Resistive RAM), or the like. The nonvolatile memory device 400 may be connected to the storage controller 100 through a plurality of channels. Hereinafter, some exemplary embodiments will be described based on NAND flash memory, but the present disclosure is not limited to any particular kind of nonvolatile memory.

Figure 25:
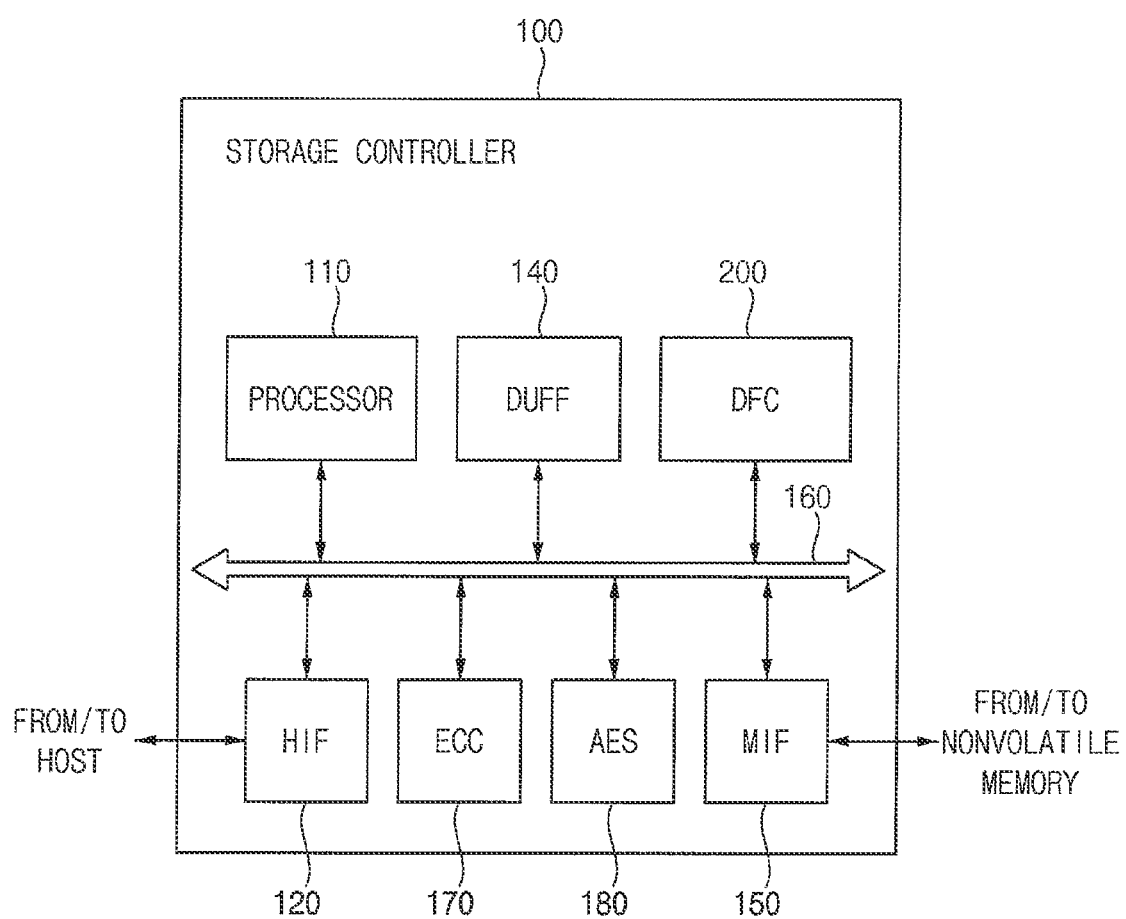
FIG. 25 is a block diagram illustrating a storage controller according to exemplary embodiments.
Figure 26:
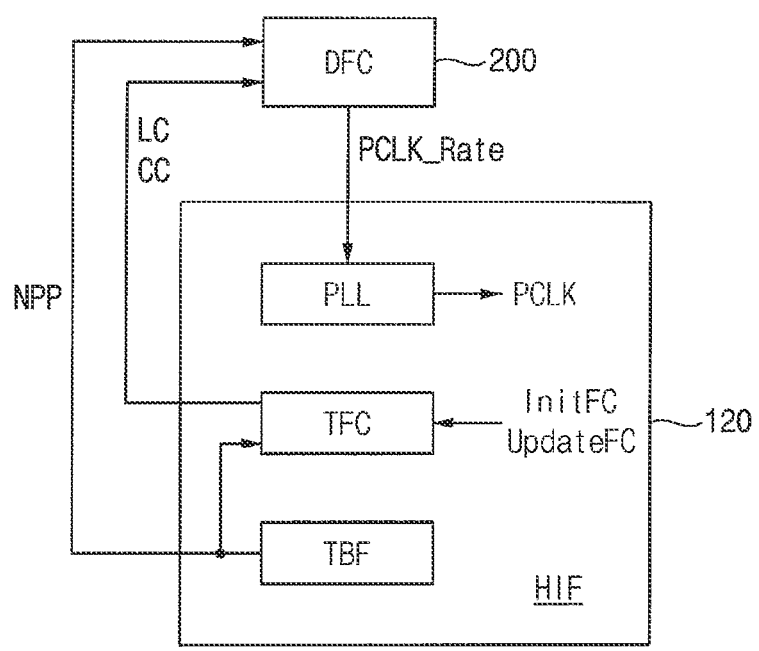
FIG. 26 is a diagram illustrating a host interface and a dynamic frequency controller included in the storage controller of FIG. 25.

FIG. 25 is a block diagram illustrating a storage controller according to exemplary embodiments, and FIG. 26 is a diagram illustrating a host interface and a dynamic frequency controller included in the storage controller of FIG. 25.

Referring to FIG. 25, a storage controller 100 may include a processor 110, a buffer memory BUFF 140, a dynamic frequency controller DFC 200, a host interface HIF 120, an error correction code (ECC) engine 170, a memory interface MIF 150, an advanced encryption standard (AES) engine 180, and an internal bus system 160 that connects the components in the storage controller 100.

The processor 110 may control an operation of the storage controller 100 in response to commands received via the host interface 120 from a host device (e.g., the host device 1100 in FIG. 24). For example, the processor 110 may control an operation of a storage device (e.g., the storage device 1200 of FIG. 24), and may control respective components by employing firmware for operating the storage device.

The buffer memory 140 may store instructions and data executed and processed by the processor 110. For example, the buffer memory 140 may be implemented with a volatile memory, such as a DRAM, a SRAM, a cache memory, or the like.

The ECC engine 170 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), or the like. In some exemplary embodiments, the ECC engine 170 may perform ECC encoding and ECC decoding using above-described codes or other error correction codes.

The host interface 120 may provide physical connections between the host device 1100 and the storage device 1200. The host interface 120 may provide an interface that corresponds to a bus format of the host device 1100 for communication between the host device 1100 and the storage device 1200. In some exemplary embodiments, the bus format of the host device 1100 may be a small computer system interface (SCSI) or a serial attached SCSI (SAS) interface. In other exemplary embodiments, the bus format of the host device may be a USB, a peripheral component interconnect (PCI) express (PCIe), an advanced technology attachment (ATA), a parallel ATA (PATA), a SATA, a nonvolatile memory (NVM) express (NVMe), or other format.

The memory interface 150 may exchange data with a nonvolatile memory device (e.g., the nonvolatile memory device 400 in FIG. 24). The memory interface 150 may transfer data to the nonvolatile memory device 400, and/or may receive data read from the nonvolatile memory device 400. In some exemplary embodiments, the memory interface 150 may be connected to the nonvolatile memory device 400 via one channel. In other exemplary embodiments, the memory interface 150 may be connected to the nonvolatile memory device 400 via two or more channels. The memory interface 150 may be configured to comply with a standard protocol, such as Toggle or open NAND flash interface (ONFI).

The AES engine 180 may perform at least one of an encryption operation and a decryption operation on data input to the storage controller 100 using a symmetric-key algorithm. The AES engine 180 may include an encryption module and a decryption module. For example, the encryption module and the decryption module may be implemented as separate modules. In another example, one module capable of performing both encryption and decryption operations may be implemented in the AES engine 180.

Referring to FIGS. 24, 25 and 26, the host interface 120 may include the transmission buffer TBF, a transmission flow controller TFC and the phase-locked loop PLL.

The transmission buffer TBF may store pending transaction layer packets to be transferred to the host device. The transmission flow controller TFC may control a flow of transaction layer packets to be transferred to the host device based on the flow control packets InitFC and UpdateFC received from the host device.

The dynamic frequency controller DFC 200 may control the frequency of the internal clock signal PCLK of the storage controller 100 by monitoring the state of the transmission buffer TBF and the state of the transmission flow controller TFC.

In some exemplary embodiments, the dynamic frequency controller 200 may monitor the number NPP of the pending transaction layer packets, which corresponds to the state of the transmission buffer TBF, and monitor the limit credit LC and the consumed credit CC, which correspond to the state of the transmission flow controller TFC. As described with reference to FIGS. 14 through 18, the dynamic frequency controller 200 may increase or decrease the control value PCLK_Rate step by step. The phase-locked loop PLL may generate the internal clock signal PCLK having the frequency corresponding to the control value PCLK_Rate.

Figure 27:
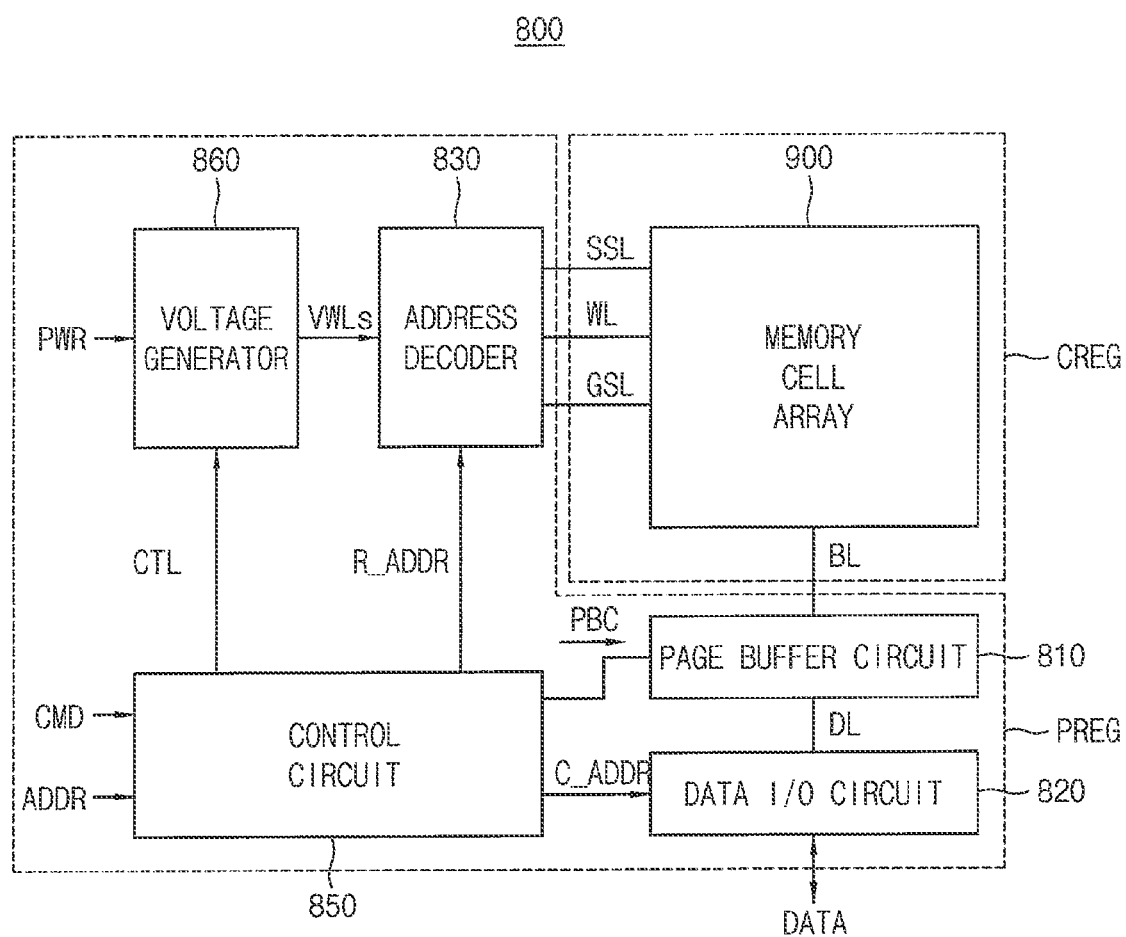
FIG. 27 is a block diagram illustrating an exemplary embodiment of a nonvolatile memory device included in a storage device according to exemplary embodiments.

FIG. 27 is a block diagram illustrating an exemplary embodiment of a nonvolatile memory device included in a storage device according to exemplary embodiments.

Referring to FIG. 27, a nonvolatile memory device 800 may include a memory cell array 900, a page buffer circuit 810, a data input/output (I/O) circuit 820, an address decoder 830, a control circuit 850, and a voltage generator 860. In some exemplary embodiments, the nonvolatile memory device 800 may have a cell over periphery (COP) structure in which a memory cell array is arranged over peripheral circuits. In this case, the memory cell array 900 may be formed in a cell region CREG, and the page buffer circuit 810, the data I/O circuit 820, the address decoder 830, the control circuit 850, and the voltage generator 860 may be formed in a peripheral region PREG.

The memory cell array 900 may be coupled to the address decoder 830 through string selection lines SSL, wordlines WL, and ground selection lines GSL. The memory cell array 900 may be coupled to the page buffer circuit 810 through a bitlines BL. The memory cell array 900 may include memory cells coupled to the wordlines WL and the bitlines BL. In some exemplary embodiments, the memory cell array 900 may be a three-dimensional memory cell array, which may be formed on a substrate in a three-dimensional structure (or a vertical structure). In this case, the memory cell array 900 may include cell strings (e.g., NAND strings) that are vertically oriented such that at least one memory cell is located over another memory cell.

The control circuit 850 may receive a command signal CMD and an address signal ADDR from a memory controller, and may control erase, program, and read operations of the nonvolatile memory device 800 in response to (or based on) at least one of the command signal CMD and the address signal ADDR. The erase operation may include performing a sequence of erase loops, and the program operation may include performing a sequence of program loops. Each program loop may include a program operation and a program verification operation. Each erase loop may include an erase operation and an erase verification operation. The read operation may include a normal read operation and data recover read operation.

In some exemplary embodiments, the control circuit 850 may generate control signals CTL used to control the operation of the voltage generator 860, and may generate a page buffer control signal PBC for controlling the page buffer circuit 810, based on the command signal CMD, and may generate a row address R_ADDR and a column address C_ADDR based on the address signal ADDR. The control circuit 850 may provide the row address R_ADDR to the address decoder 530, and may provide the column address C_ADDR to the data I/O circuit 520.

The address decoder 830 may be coupled to the memory cell array 900 through the string selection lines SSL, the wordlines WL, and the ground selection lines GSL. During the program operation or the read operation, the address decoder 530 may determine (or select) one of the wordlines WL as a selected wordline, and may determine or designate the remaining wordlines WL other than the selected wordline as unselected wordlines based on the row address R_ADDR.

In addition, during the program operation or the read operation, the address decoder 830 may determine one of the string selection lines SSL as a selected string selection line and determine or designate the remaining the string selection lines SSL other than the selected string selection line as unselected string selection lines based on the row address R_ADDR.

The voltage generator 860 may generate wordline voltages VWL, which are used for the operation of the memory cell array 900 of the nonvolatile memory device 800, based on the control signals CTL. The voltage generator 860 may receive the power PWR from the memory controller. The wordline voltages VWL may be applied to the wordlines WL through the address decoder 830.

In some exemplary embodiments, during the erase operation, the voltage generator 860 may apply an erase voltage to a well and/or a common source line of a memory block, and may apply an erase permission voltage (e.g., a ground voltage) to all of the wordlines of the memory block or a portion of the wordlines based on an erase address. During the erase verification operation, the voltage generator 860 may apply an erase verification voltage simultaneously to all of the wordlines of the memory block or sequentially (e.g., one by one) to the wordlines.

In some exemplary embodiments, during the program operation, the voltage generator 860 may apply a program voltage to the selected wordline, and may apply a program pass voltage to the unselected wordlines. During the program verification operation, the voltage generator 860 may apply a program verification voltage to the first wordline, and may apply a verification pass voltage to the unselected wordlines.

During the normal read operation, the voltage generator 860 may apply a read voltage to the selected wordline, and may apply a read pass voltage to the unselected wordlines. During the data recover read operation, the voltage generator 860 may apply the read voltage to a wordline adjacent to the selected wordline, and may apply a recover read voltage to the selected wordline.

The page buffer circuit 810 may be coupled to the memory cell array 900 through the bitlines BL. The page buffer circuit 810 may include multiple buffers. In some exemplary embodiments, each buffer may be connected to only a single bitline. In other exemplary embodiments, each buffer may be connected to two or more bitlines. The page buffer circuit 810 may temporarily store data to be programmed in a selected page or data read out from the selected page of the memory cell array 900.

The data I/O circuit 820 may be coupled to the page buffer circuit 810 through data lines DL. During the program operation, the data I/O circuit 820 may receive program data DATA received from the memory controller and provide the program data DATA to the page buffer circuit 810 based on the column address C_ADDR received from the control circuit 550. During the read operation, the data I/O circuit 820 may provide read data DATA, having been read from the memory cell array 900 and stored in the page buffer circuit 810, to the memory controller based on the column address C_ADDR received from the control circuit 550.

The page buffer circuit 810 and the data I/O circuit 820 may read data from a first area of the memory cell array 900, and may write this read data to a second area of the memory cell array 900 (e.g., without transmitting the data to a source external to the nonvolatile memory device 800, such as to the memory controller). Thus, the page buffer circuit 810 and the data I/O circuit 820 may perform a copy-back operation.

Figure 28:
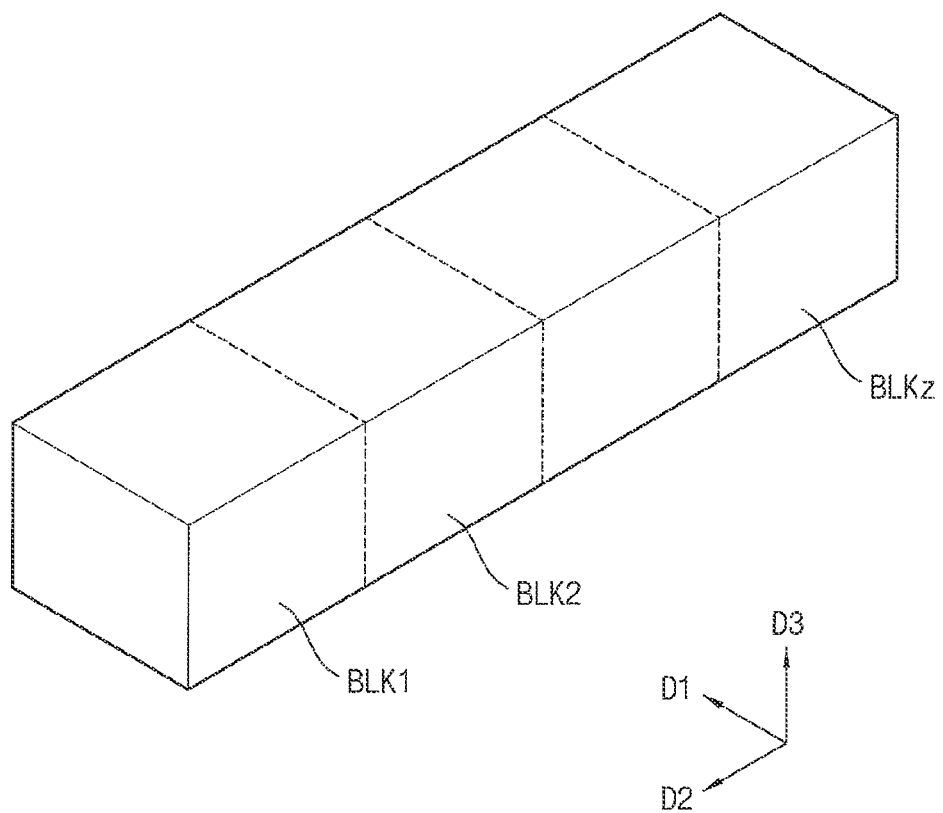
FIG. 28 is a block diagram illustrating a memory cell array included in the nonvolatile memory device of FIG. 27.
Figure 29:
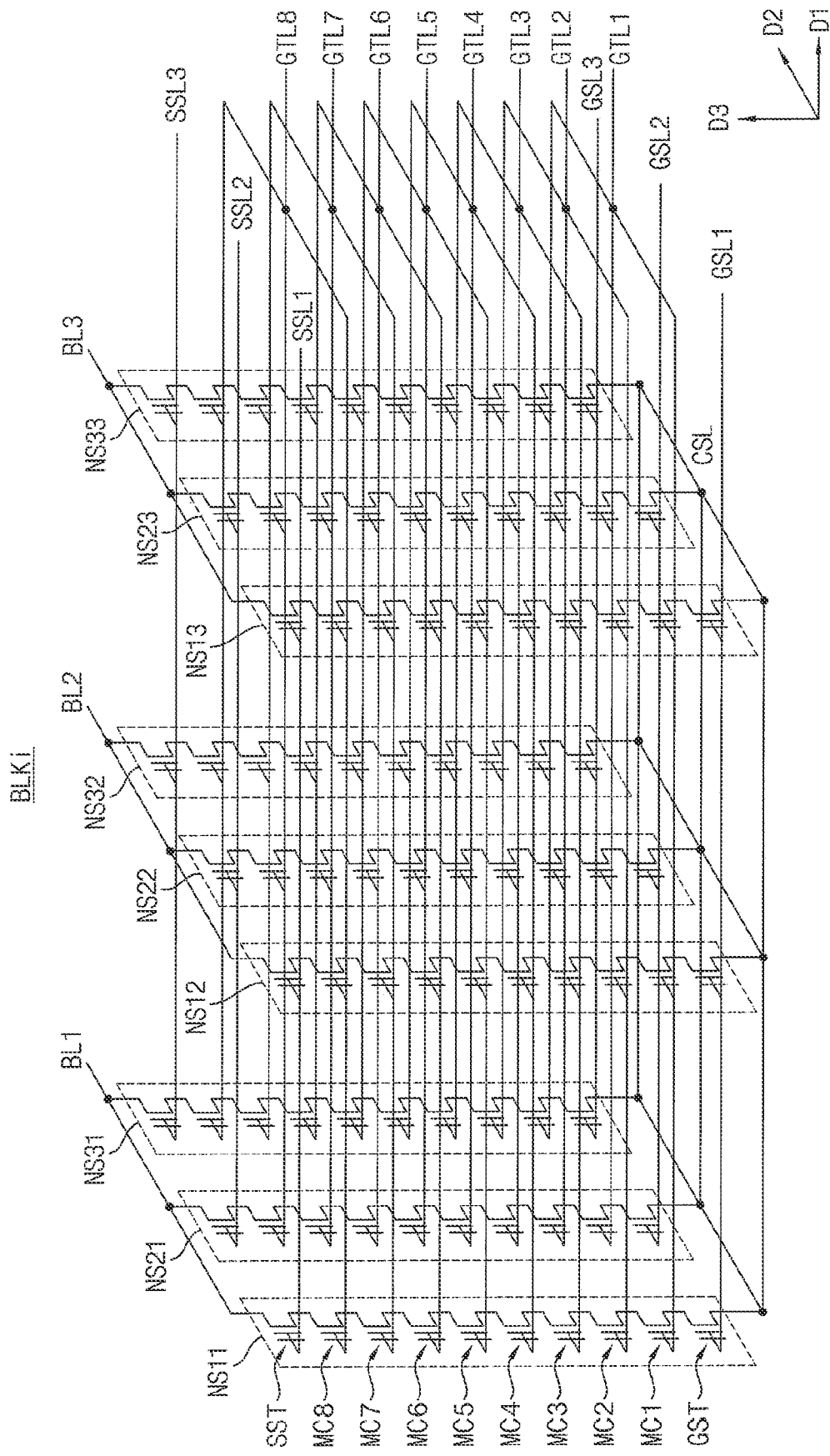
FIG. 29 is a circuit diagram illustrating an equivalent circuit of a memory block included in the memory cell array of FIG. 28.

FIG. 28 is a block diagram illustrating a memory cell array included in the nonvolatile memory device of FIG. 27, and FIG. 29 is a circuit diagram illustrating an equivalent circuit of a memory block included in the memory cell array of FIG. 28.

Referring to FIG. 28, the memory cell array 900 may include memory blocks BLK1 to BLKz. In some exemplary embodiments, the memory blocks BLK1 to BLKz may be selected by the address decoder 830 of FIG. 27. For example, the address decoder 830 may select a particular memory block BLK corresponding to a block address among the memory blocks BLK1 to BLKz.

A memory block BLKi of FIG. 29 may be formed on a substrate in a three-dimensional structure (or a vertical structure). For example, NAND strings or cell strings included in the memory block BLKi may be formed in a vertical direction D3 perpendicular to an upper surface of a substrate.

Referring to FIG. 29, the memory block BLKi may include NAND strings NS11 to NS33 coupled between bitlines BL1, BL2, and BL3 and a common source line CSL. Each of the NAND strings NS11 to NS33 may include a string selection transistor SST, a memory cells MC1 to MC8, and a ground selection transistor GST. In FIG. 29, each of the NAND strings NS11 to NS33 are illustrated to include eight memory cells MC1 to MC8. However, exemplary embodiments are not limited thereto, and each of the NAND strings NS11 to NS33 may include various numbers of memory cells.

Each string selection transistor SST may be connected to a corresponding string selection line (one of SSL1 to SSL3). The memory cells MC1 to MC8 may be connected to corresponding gate lines GTL1 to GTL8, respectively. The gate lines GTL1 to GTL8 may be wordlines, and some of the gate lines GTL1 to GTL8 may be dummy wordlines. Each ground selection transistor GST may be connected to a corresponding ground selection line (one of GSL1 to GSL3). Each string selection transistor SST may be connected to a corresponding bitline (e.g., one of BL1, BL2, and BL3), and each ground selection transistor GST may be connected to the common source line CSL.

Wordlines (e.g., WL1) having the same or similar height may be connected in common, and the ground selection lines GSL1 to GSL3 and the string selection lines SSL1 to SSL3 may be separated. In FIG. 29, the memory block BLKi is illustrated as being coupled to eight gate lines GTL1 to GTL8 and three bitlines BL1 to BL3. However, exemplary embodiments are not limited thereto, and each memory block in the memory cell array 500 may be coupled to various numbers of wordlines and various numbers of bitlines.

Figure 30:
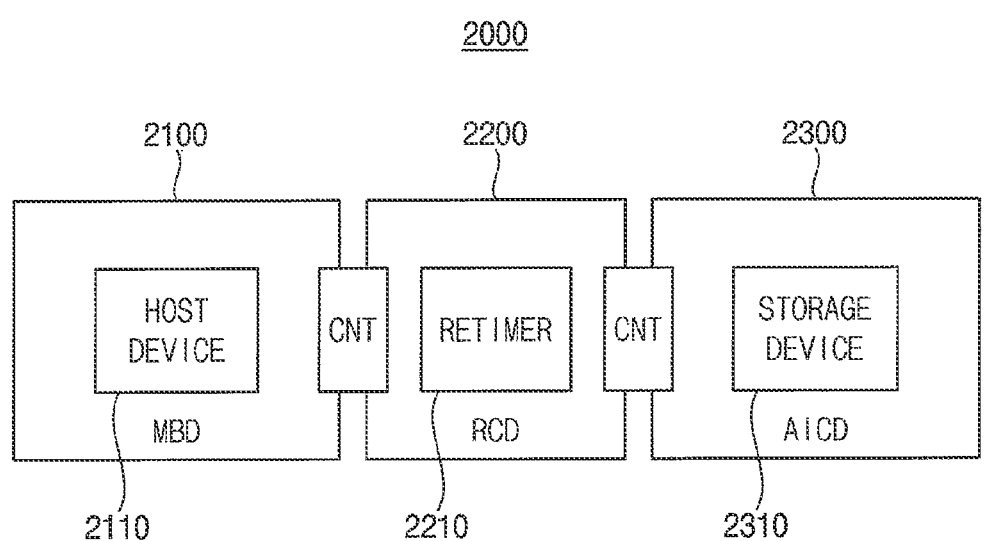
FIG. 30 is a block diagram illustrating a system according to exemplary embodiments.

FIG. 30 is a block diagram illustrating a system according to exemplary embodiments.

Referring to FIG. 30, a system 2000 may include a host device 2110, a storage device 2310 and a retimer 2210 disposed between the host device 2110 and the storage device 2310. In some exemplary embodiments, the host device 2110 may be mounted on a motherboard MBD 2100, the retimer 2210 may be mounted on a RCD card 2200, and the storage device 2310 may be mounted on an add-in card AICD 2300. The motherboard 2100, the RCD card 2200 and the add-in card 2300 may be electrically connected through connectors CNT.

As described above, the storage device 2310 may reduce power consumption of the storage device 2310 and prevent transfer delay from the storage device 2300 to the host device 2110 by controlling the frequency of the internal clock signal of the storage device 2310 based on the monitoring result of the state of the transmission buffer and the state of the transmission flow controller.

The inventive concept may be applied to any electronic devices and systems requiring signal transfer. For example, the inventive concept may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the present inventive concept.

What is claimed is:
1. A system comprising:
a transmission device and a reception device that are connected through a link,
the reception device including:
a reception buffer configured to receive and store transaction layer packets; and
a reception flow controller configured to generate flow control packets by monitoring an occupation state of the reception buffer, the transmission device including:
- a transmission buffer configured to store pending transaction layer packets to be transferred to the reception device;
- a transmission flow controller configured to control a flow of transaction layer packets to be transferred to the reception device based on the flow control packets received from the reception device; and
- a dynamic frequency controller configured to control a frequency of an internal clock signal of the transmission device by monitoring a state of the transmission buffer and a state of the transmission flow controller.

2. The system of claim 1, wherein the transmission flow controller is configured to:
- determine whether a storage space of the reception buffer is insufficient to store the transaction layer packets, based on a difference between a limit credit and a consumed credit where the limit credit is updated based on an allocated credit included in the flow control packets and the consumed credit corresponds to a number of the transaction layer packets that are transferred to the reception device; and
- block transmission of the transaction layer packets to the reception device when the transmission flow controller determines that the storage space of the reception buffer is insufficient to store the transaction layer packets.

3. The system of claim 1, wherein the dynamic frequency controller is configured to increase the frequency of the internal clock signal when a flow delay state occurs such that a number of the pending transaction layer packets stored in the transmission buffer is equal to or greater than one and the transmission flow controller blocks the transmission of the transaction layer packets to the reception device.

4. The system of claim 3, wherein the dynamic frequency controller is configured to set a plurality of step frequencies and increase the frequency of the internal clock signal step by step starting from a minimum frequency among the plurality of step frequencies until the frequency of the internal clock signal reaches a maximum frequency among the plurality of step frequencies.

5. The system of claim 4, wherein the dynamic frequency controller is configured to initialize the frequency of the internal clock signal to the minimum frequency when resetting of the link is completed.

6. The system of claim 4, wherein the dynamic frequency controller is configured to determine periodically whether the flow delay state occurs and increase the frequency of the internal clock signal by one step whenever it is determined that the flow delay state occurs, until the frequency of the internal clock signal reaches the maximum frequency.

7. The system of claim 4, wherein the dynamic frequency controller is configured to maintain the frequency of the internal clock signal at the maximum after the frequency of the internal clock signal reaches the maximum frequency and until the link is reset.

8. The system of claim 4, wherein the dynamic frequency controller is configured to decrease the frequency of the internal clock signal when the number of the pending transaction layer packets stored in the transmission buffer is smaller than a reference number and a smooth flow state occurs such that the transmission flow controller allows the transmission of the transaction layer packets to the reception device.

9. The system of claim 8, wherein the dynamic frequency controller is configured to determine periodically whether the smooth flow state occurs and decrease the frequency of the internal clock signal by one step whenever it is determined that the smooth flow state occurs, until the frequency of the internal clock signal reaches the minimum frequency.

10. The system of claim 1, wherein dynamic frequency controller is configured to increase the frequency of the internal clock signal when a difference between a limit credit and a consumed credit is smaller than a first reference credit where the limit credit is updated based on an allocated credit included in the flow control packets and the consumed credit corresponds to a number of the transaction layer packets that are transferred to the reception device.

11. The system of claim 10, wherein the dynamic frequency controller is configured to decrease the frequency of the internal clock signal when the difference between the limit credit and the consumed credit is greater than a second reference credit where the second reference credit is greater than the first reference credit.

12. The system of claim 1, wherein the dynamic frequency controller is configured to determine, by a first cyclic period, whether to increase the frequency of the internal clock signal and determine, by a second cyclic period, whether to decrease the frequency of the internal clock signal, where the second cyclic period is longer than the first cyclic period.

13. The system of claim 1, wherein the internal clock signal corresponds to a PIPE (PHY Interface for PCI Express) clock signal that is used to synchronize signal transfer between a PHY layer and an internal logic circuit of the transmission device.

14. The system of claim 1, wherein the dynamic frequency controller is configured to increase the frequency of the internal clock signal to increase a speed of a flow control update operation by the transmission device when a transfer delay from the transmission device to the reception device occurs, regardless of a frequency of a bit rate clock signal that is used to control transfer speed between the transmission device and the reception device.

15. The system of claim 1, further comprising:
- a retimer disposed between the transmission device and the reception device.

16. The system of claim 1, wherein the transmission device and the reception device are connected through a peripheral component interconnect express (PCIe) link according to PCIe standards.

17. A storage device commented to a host device through a peripheral component interconnect express (PCIe) link according to PCIe standards, comprising:
- a nonvolatile memory device configured to store data; and
- a storage controller configured to control the nonvolatile memory device,
- the storage controller including:
  - a transmission buffer configured to store pending transaction layer packets to be transferred to the host device;
  - a transmission flow controller configured to control a flow of transaction layer packets to be transferred to the host device based on flow control packets received from the host device; and
  - a dynamic frequency controller configured to control a frequency of an internal clock signal of the storage controller by monitoring a state of the transmission buffer and a state of the transmission flow controller.

18. The storage device of claim 17, wherein the dynamic frequency controller is configured to increase the frequency of the internal clock signal when a flow delay state occurs such that a number of the pending transaction layer packets stored in the transmission buffer is equal to or greater than one and the transmission flow controller blocks the transmission of the transaction layer packets to the host device.

19. The storage device of claim 18, wherein the dynamic frequency controller is configured to set a plurality of step frequencies and increase the frequency of the internal clock signal step by step starting from a minimum frequency among the plurality of step frequencies until the frequency of the internal clock signal reaches a maximum frequency from the plurality of step frequencies, and wherein the dynamic frequency controller is configured to initialize the frequency of the internal clock signal to the minimum frequency when resetting of the PCIe link is completed.

20. A system comprising:

a first device and a second device that are connected through a peripheral component interconnect express (PCIe) link according to PCIe standards, each of the first device and the second device including:
  a reception buffer configured to receive and store transaction layer packets that are transferred through the PCIe link;
  a reception flow controller configured to generate flow control packets by monitoring an occupation state of the reception buffer;
  a transmission buffer configured to store pending transaction layer packets to be transferred through the PCIe link;
  a transmission flow controller configured to control a flow of transaction layer packets transferred through the PCIe link based on the flow control packets received through the PCIe link; and
  a dynamic frequency controller configured to control a frequency of an internal clock signal of each of the first device and second device by monitoring a state of the transmission buffer and a state of the transmission flow controller.

* * * * *